(12) United States Patent
Matsumoto

(10) Patent No.: US 9,569,146 B2
(45) Date of Patent: Feb. 14, 2017

(54) INFORMATION PROCESSOR AND AUTOMATIC PAGE REPLACEMENT METHOD

(71) Applicant: FUJIFILM Corporation, Tokyo (JP)

(72) Inventor: Hiroshi Matsumoto, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/739,584

(22) Filed: Jun. 15, 2015

(65) Prior Publication Data

US 2016/0019006 A1    Jan. 21, 2016

(30) Foreign Application Priority Data

Jul. 17, 2014  (JP) ................. 2014-146578

(51) Int. Cl.
*G06F 3/12* (2006.01)

(52) U.S. Cl.
CPC .......... *G06F 3/1204* (2013.01); *G06F 3/1247* (2013.01); *G06F 3/1285* (2013.01)

(58) Field of Classification Search
USPC ...................................................... 358/1.15
See application file for complete search history.

(56) References Cited

U.S. PATENT DOCUMENTS

| | | | |
|---|---|---|---|
| 8,700,987 B2* | 4/2014 | Spalink | G06F 17/241 715/230 |
| 2004/0158655 A1* | 8/2004 | Kremer | G06K 15/00 710/8 |
| 2006/0218496 A1* | 9/2006 | Kunori | G06F 3/1204 715/210 |
| 2009/0129680 A1 | 5/2009 | Nozaki | |
| 2009/0307264 A1 | 12/2009 | Makishima et al. | |
| 2014/0211250 A1* | 7/2014 | Tsutsumi | G06K 15/1807 358/1.15 |

FOREIGN PATENT DOCUMENTS

| | | |
|---|---|---|
| JP | 2003-076996 A | 3/2003 |
| JP | 2006304276 A | 11/2006 |
| JP | 2007079616 A | 3/2007 |
| JP | 2009140478 A | 6/2009 |
| JP | 2009-295164 A | 12/2009 |

OTHER PUBLICATIONS

Communication dated Sep. 16, 2016, from the Japanese Patent Office in counterpart application No. 2014-146578.

* cited by examiner

*Primary Examiner* — Ngon Nguyen
(74) *Attorney, Agent, or Firm* — Sughrue Mion, PLLC

(57) ABSTRACT

An information processor comprising a storage unit, a data acquisition unit, a search unit, and a replacement unit, wherein each of the first document data and the second document data is expressed in a page description language, and the search unit includes an object type determination unit configured to determine one kind of object type used in the search processing on the basis of priority of search defined with respect to plural object types, and an object type search processing unit configured to perform the search processing by comparing an object belonging to the one kind of object type determined by the object type determination unit of the objects included in the page after modification with an object belonging to the one kind of object type of objects included in each of the plural pages in the first document data.

14 Claims, 13 Drawing Sheets

FIG.12A

ABCDE ⇔ ABDCE

FIG.12B

ABCDE ⇔ <u>ABCDE</u>

INFORMATION PROCESSOR AND AUTOMATIC PAGE REPLACEMENT METHOD

CROSS-REFERENCE TO RELATED APPLICATIONS

The patent application claims priority under 35 U.S.C. §119 to Japanese Patent Application No. 2014-146578, filed on Jul. 17, 2014. Each of the above application(s) is hereby expressly incorporated by reference, in its entirety, into the present application.

BACKGROUND OF THE INVENTION

Field of the Invention

The present invention relates to an information processor, and an automatic page replacement method, and particularly relates to an information processing technology dealing with document data as an electronic manuscript for printing.

Description of the Related Art

In recent years, a manuscript for printing is created on a computer, and treated as electronic data (in Japanese Patent Application Laid-Open No. 2009-295164 and Japanese Patent Application Laid-Open No. 2003-76996). Document data described by a page description language (PDL) has been widely used as a data format of the electronic manuscript for printing. An electronic document described by the PDL is referred to as a "PDL document", and data of the PDL document is referred to as "PDL data".

The PDL data is data for expressing printing content for each page on the basis of an object including characters or images. The PDL data is vector data independent of a resolution or the like of an output device such as a printer or a platesetter. The PDL data is subjected to rasterization processing by a raster image processor (RIP) to be converted into raster image data which expresses as a set of pixels an object including characters and images constituting a page image. The raster image data is data obtained by encoding pixels in a page into a digital format. A printer performs printing on the basis of the raster image data and a platesetter performs plate making on the basis of the raster image data.

SUMMARY OF THE INVENTION

The electronic manuscript for printing is usually revised or modified several times to finally bring a manuscript to completion. In particular, the electronic manuscript of a printed material having plural pages such as a magazine, a catalog, a photo book and the like is sometimes subjected to modification only for a part of the pages and the modified pages are replaced in units of pages at a stage in an edit work, a proofread work or the like. Modifying and replacing a part of pages of a written document having the plural pages is called "page replacement". A "written document" means an electronic document and is referred to as a PDL document here.

In a manuscript submission system of related art, when the page replacement is performed, an operator needs to specify a page number of a replace destination that is to be replaced, from among the plural pages in the electronic manuscript. When the operator specifies the page number of a replace destination page, content of the specified replace destination page is processed to be replaced with a replacement page that is a page after modification which is newly submitted. The "replace destination page" is a page subjected to replacement that is to be replaced, and is a "page before modification". The "replacement page" is a "page after modification" having changed content of the page subjected to replacement.

However, if the operator does not grasp the page number of the replace destination, he/she has to found out the page of the replace destination from among the plural pages. It bears a great work burden and takes time for the operator to find out the page of the replace destination while confirming the content of the respective plural pages.

Even in a case where the page number of the replace destination is known, operations of at least three stages shown below are required, resulting in a great burden on the operator, which is inefficient.

[1] Specifying page number, [2] Confirming replace destination page, [3] Selecting replacement page.

The present invention has been made in consideration of such a circumstance, and has an object to provide an information processor and an automatic page replacement method capable of reducing a work burden on the operator involved by the page replacement.

In order to solve problems, aspects of the invention below are provided.

An information processor according to a first aspect including a storage unit configured to store therein first document data having plural pages, a data acquisition unit configured to acquire second document data including at least a page after modification that is to be replaced with a part of the plural pages, a search unit configured to perform search processing for identifying a page before modification corresponding to the page after modification from among the plural pages in the first document data, and a replacement unit configured to replace the page before modification in the first document data identified by the search unit with the page after modification included in the second document data, in which each of the first document data and the second document data is expressed in a page description language, and the search unit includes an object type determination unit configured to determine one kind of object type used in the search processing on the basis of priority of search defined with respect to plural object types, objects being classified into the plural object types used for the page description language, and by analyzing an object structure of the page after modification included in the second document data, and an object type search processing unit configured to perform the search processing by comparing an object belonging to the one kind of object type determined by the object type determination unit of the objects included in the page after modification with an object belonging to the one kind of object type of objects included in each of the plural pages in the first document data.

According to the first aspect, the page after modification whose content is modified with respect to a part of pages of the plural pages in the first document data is acquired as the second document data. Even if a replace destination page is not specified for the page after modification, the object structure of the page after modification is analyzed and the page before modification corresponding to the page after modification is automatically identified from among the plural pages in the first document data to perform the page replacement processing. This reduces the work burden on the operator involved by the page replacement. The search processing performed using one kind of object type of the plural object types can relatively reduce an amount of searching calculation to give a search result in a short time.

As a second aspect, the information processor in the first aspect may have a configuration which includes an operation unit configured to accept a user operation specifying the priority; and a priority setting unit configured to set the priority specified from the operation unit to the plural object types.

The configuration may be such that the priority indicating ordering of priority of the object type used for search is defined in advance, or the user can specify the priority via the operation unit.

As a third aspect, the information processor in the first aspect or the second aspect may have a configuration which includes an analogy evaluation unit configured to evaluate analogies between the objects for each of the plural object types in units of objects which belong to the same object type.

The configuration may be such that the analogy of the object is calculated to identify an analogous page in order to find out the page before modification corresponding to the page after modification from among the plural pages in the first document data.

As a fourth aspect, the information processor in any one of the first aspect to the third aspect may have a configuration in which the plural object types include a character, an image, and a graphic.

The "character" is synonymous with a "text". The "image" of the object type represents a so-called "digital photograph" and means a digital image having a digital signal value indicating a tone for each pixel. The "digital image" is synonymous with an "electronic image" or an "electrophotography". The "graphic" is a category distinguished from the "image", and refers to a line drawing or pattern created using a drawing tool or the like, or a design in combination with these and colors. The "graphic" includes a handwritten line drawing and a combination of the line drawing and coloring, the "coloring" including gradation. The term "graphic" may be replaced with the term "illustration" or "diagram".

As a fifth aspect, the information processor in the fourth aspect may have a configuration in which the priority is defined in advance as a default setting, with the priority being set in the default setting in the order that a priority for the "character" is the highest, followed by the "image", the "image" followed by the "graphic".

The search by use of the character can determine the analogy in a high speed and accurately as compared with the search by use of the image and the search by use of the graphic. Therefore, it is preferable that the priority of search by use of the character is set to the highest. Processing may be assumed to be performed in which in the search by use of the graphic, an area of the graphic object is converted into the image data in the bitmap format, and thereafter, images of the graphic are compared with each other. For this reason, the search by use of the graphic requires a processing time for data conversion to take more time than the search by use of the image. Therefore, it is preferable that the priority of the search by use of the graphic is set to have an ordering of priority lower than the priority of search by use of the image.

As a sixth aspect, the information processor in the fourth aspect or the fifth aspect may have a configuration in which the object type determination unit includes an analysis unit configured to analyze the object structure in units of pages in the second document data, and the analysis unit has a number-of-characters determination part configured to determine whether or not there exists a character object having a character string the number of characters of which is equal to or more than a first threshold, and a number-of-pixels determination part configured to determine whether or not there exists an image object the number of pixels of which is equal to or more than a second threshold.

In a case of the search by use of the character, the determination of the analogy only on the character string having characters the number of which is equal to or more than the first threshold allows search assurance to be improved.

In a case of the search by use of the image, the determination of the analogy only on the image having pixels the number of which is equal to or more than the second threshold allows more accurate analogy determination.

As a seventh aspect, the information processor in any one of the fourth aspect to sixth aspect may have a configuration which includes a graphic area extraction unit configured to create a bitmap of an area containing at least a graphic object from at least one document data of the first document data and the second document data, and extracts a bitmap area corresponding to the graphic object.

In a case of comparing the graphic objects, it is preferable to compare those in a state of images of graphics converted into images in the bitmap format.

As an eighth aspect, the information processor in the first aspect to the seventh aspect may have a configuration which includes a display unit configured to display page content of each of the page before modification in the first document data and the page after modification, a difference detection unit configured to detect a difference between an object included the page after modification and an object included in the page before modification by comparing the page after modification that is to be subjected to the page replacement processing by the replacement processing unit with the page before modification in the first document data which is identified by the search unit with respect to the page after modification, the page after modification and the page before modification being in a state of an object of page description data written by the page description language, and a display control unit configured to control the display unit to display the information on the difference detected by the difference detection unit.

According to the eighth aspect, the page before modification and the page after modification can be compared on a screen of the display unit to confirm a changed portion. According to the eighth aspect, a difference in attribute information of the object can be also detected, and thus, content of change in the attribute can be also confirmed. Additionally, according to the eighth aspect, only a portion actually changed in the content of the object can be detected. Moreover, the comparison can be performed with a viewpoint being specified such as limitation on the object type or the like.

The information processor in a ninth aspect may have a configuration in which, in the information processor in the eighth aspect, a display mode in which the display unit displays the difference includes a plurality of modes that is at least two modes of a first mode in which both the page after modification and the page before modification are arranged to be displayed, a second mode in which the page after modification and the page before modification are toggled to be displayed, and a third mode in which a difference between the page after modification and the page before modification is intensified to be displayed.

As a tenth aspect, the information processor in the eighth aspect or the ninth aspect may have a configuration in which the display control unit displays an icon at a portion on the object at which a difference is detected by the difference detection unit, and changes a form of the icon depending on a magnitude of the difference detected by the difference detection unit.

A non-transitory computer-readable medium recording a program according to an eleventh aspect is a non-transitory computer-readable medium recording a program causing a computer to implement a storage function to store first document data having plural pages, a data acquisition function to acquire second document data including at least a page after modification that is to be replaced with a part of the plural pages, a search function to perform search processing for identifying a page before modification corresponding to the page after modification from among the plural pages in the first document data, and a replacement function to replace the page before modification in the first document data identified by the search function with the page after modification included in the second document data, in which each of the first document data and the second document data is expressed in a page description language, and the search function includes an object type determination function to determine one kind of object type used in the search processing on the basis of priority of search defined with respect to plural object types, objects being classified into the plural object types used for the page description language, and by analyzing an object structure of the page after modification included in the second document data, and an object type search processing function to perform the search processing by comparing an object belonging to the one kind of object type determined by the object type determination function of the objects included in the page after modification with an object belonging to the one kind of object type of objects included in each of the plural pages in the first document data.

The program in the eleventh aspect may have an adequate combination of items the same as specified items of the information processor specified in from the second aspect to the tenth aspect. In this case, the processing unit or function unit as a device which serves as the processing and function specified in the information processor can be grasped as an element of the "functions" of the program executing the corresponding processing and operation.

An automatic page replacement method according to a twelfth aspect is an automatic page replacement method including a storage step of storing first document data having plural pages, a data acquisition step of acquiring second document data including at least a page after modification that is to be replaced with a part of the plural pages, a search step of performing search processing for identifying a page before modification corresponding to the page after modification from among the plural pages in the first document data, and a replacement step of replacing the page before modification in the first document data identified by the search step with the page after modification included in the second document data, in which each of the first document data and the second document data is expressed in a page description language, and the search step includes an object type determination step of determining one kind of object type used in the search processing on the basis of priority of search defined with respect to plural object types, objects being classified into the plural object types used for the page description language, and by analyzing an object structure of the page after modification included in the second document data, and an object type search processing step of performing the search processing by comparing an object belonging to the one kind of object type determined by the object type determination step of the objects included in the page after modification with an object belonging to the one kind of object type of objects included in each of the plural pages in the first document data.

The automatic page replacement method in the twelfth aspect may have an adequate combination of items the same as specified items of the information processor specified in from the second aspect to the tenth aspect. In this case, the processing unit or function unit as a device which serves as the processing and function specified in the information processor can be grasped as an element of the "steps" of the corresponding processing and operation.

According to the present invention, a work burden on the operator involved by the page replacement of a manuscript for printing can be reduced.

BRIEF DESCRIPTION OF THE DRAWINGS

FIG. 12A is an illustration diagram of an example comparing content of character strings;

FIG. 12B is an illustration diagram of an example comparing appearances of character strings; FIG. 13A shows an exemplary PDL page, FIG. 13B shows an exemplary image from which objects of characters and image are removed and which is converted into a bitmap, and FIG. 13C shows an example where the graphic area is extracted from the bitmap in FIG. 13B.

DETAILED DESCRIPTION OF THE PREFERRED EMBODIMENTS

Hereinafter, a description is given in detail of embodiments of the present invention with reference to the accompanying drawings.

Figure 1:
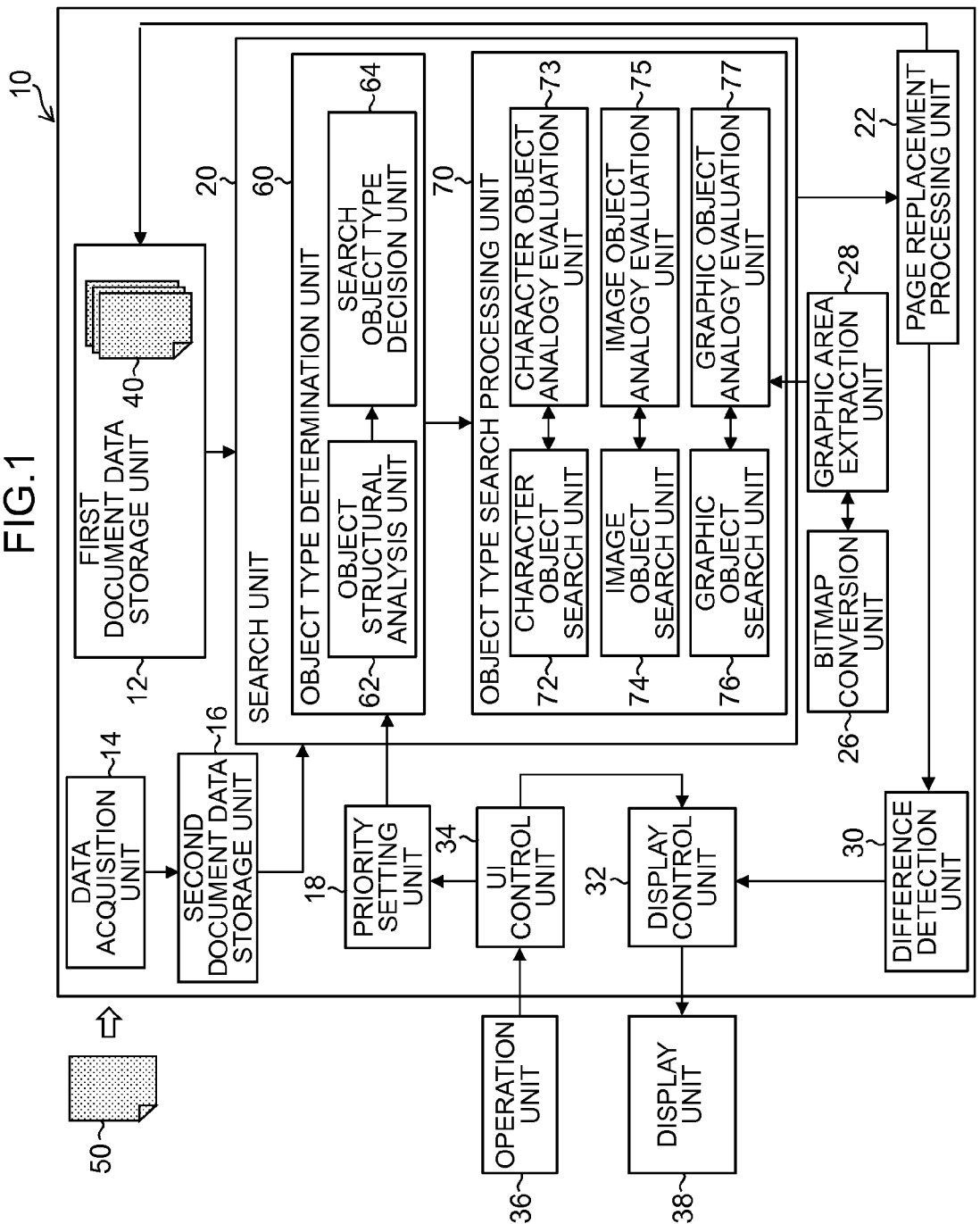
FIG. 1 is a block diagram showing a configuration of an information processor according to an embodiment of the invention.

FIG. 1 is a block diagram showing a configuration of an information processor 10 according to an embodiment of the invention. The information processor 10 includes a first document data storage unit 12, data acquisition unit 14, second document data storage unit 16, priority setting unit 18, search unit 20, and page replacement processing unit 22. The information processor 10 further includes a bitmap conversion unit 26, graphic area extraction unit 28, difference detection unit 30, display control unit 32, user interface (UI) control unit 34, operation unit 36, and display unit 38.

The information processor 10 may be achieved by combining hardware and software of a computer. The term "software" is synonymous with the program. The "computer" includes various types of computers such as a desktop type, notebook type, or tablet type. The information processor 10 can be achieved using one computer and can also be achieved using a plurality of computers to divide functions. The information processor 10 may be achieved as one function of a server or may be achieved as one function of a client terminal.

The function of the information processor 10 can be achieved as one function of a DTP (Desk Top Publishing) device, or as one function of a RIP (Raster Image Processor) device. The DTP device is a device for creating an electronic manuscript representing image content intended to be printed. The DTP device is used for working to edit and lay out on a printing surface various kinds of image parts such as characters, images, and graphics. The DTP device may be configured to have, besides the function to create the electronic manuscript, a function to edit or proofread the electronic manuscript.

The RIP device functions as a device which subjects the data of the electronic manuscript expressed in the page description language (PDL) to the rasterization processing to convert into data of a bitmap image for printing. The RIP device performs processing for converting the document data as an electronic manuscript into data having a raster image format capable of being output by a printing device.

The information processor 10 can be achieved in a form of a print data processing device or print management device integrating the function of the DTP device and the function of the RIP device, or a computer system or the like.

The first document data storage unit 12 is a device which stores therein first document data 40 as an electronic manuscript for printing. The first document data 40 is the document data which has the plural pages, and is a multi-page electronic document including plural pages in one file. The electronic document is a document including electronic data. The "document" is synonymous with the "written document". The first document data 40 is expressed in the page description language (PDL).

The first document data 40 can be externally retrieved via the data acquisition unit 14. In case where the information processor 10 has the manuscript creating function or the manuscript edit function, the first document data 40 may be those created by use of the manuscript creating function or the manuscript edit function of the information processor 10.

The first document data storage unit 12 may be an internal storage unit built in the information processor 10 or an external storage unit coupled to the information processor 10, or a combination of these. The term "coupled" is referred to as a relationship capable of transmitting information, and independent of whether it is contact coupling or non-contact coupling. The term "coupling" is a term encompassing, for example, the contact coupling between terminals corresponding to each other, wired connection, wireless connection, optical communication connection, or proper combination of these. The coupling includes a form of a network connection coupled via a telecommunications line not shown in the figure.

The first document data storage unit 12 may be configured to include various forms of storage units such as a hard disc drive (HDD), solid state drive (SSD), RAM (Random Access Memory), optical disk or memory card, or proper combination of these.

The data acquisition unit 14 is an interface part capable of retrieving second document data 50. The second document data 50 is electronic data of a document including at least one page after modification that is to be replaced with a part of the plural pages in the first document data 40.

For the purpose of easy explanation here, a description is given of an example where one certain page of the plural pages in the first document data 40 is modified and replace. In this case, the second document data 50 representing the page after modification is the document data having only one page. However, in implementing the invention, the second document data 50 may be an electronic document file having the plural pages. In other words, two or more pages of the plural pages in the first document data 40 can be replaced, and in this case, the second document data 50 is a document file having two or more pages after modification.

The second document data 50 is expressed in the page description language similarly to the first document data 40. The document data described by page description language is referred as "page description data" or "PDL data". Each of one or more pages in the PDL data is referred to as a "PDL page". Data of the PDL page in units of pages is referred to as "page data".

Examples of the page description language include, for example, PostScript from Adobe Systems Incorporated. The PDF (Portable Document Format) as a format for page description is a file format extended from the PostScript. A PDF file corresponds to a form of the document data described by the page description language.

The first document data 40 may be, for example, a multi-page file type of electronic document in the PDF. The second document data 50 can also be submitted in a file type of PDF.

The data acquisition unit 14 may be configured to include a data input terminal which retrieves the second document data 50 from the external or another signal processor within the device. As the data acquisition unit 14, a wired or wireless communication interface part may be used and a medium interface part for reading out and writing in an external storage medium such as a memory card may be used, or proper combination of these aspects may be used. The data acquisition unit 14 may function as a device which retrieves not only the second document data 50 but also the first document data 40 and other various pieces of data.

The second document data storage unit 16 is a device which stores therein the second document data 50 acquired via the data acquisition unit 14. The second document data storage unit 16 and the first document data storage unit 12 may be configured respectively as a separate storage unit, or may be configured to have a storage area divided in an identical storage unit.

The priority setting unit 18 is a device which sets priority of search with respect to plural object types used for the PDL data. Kinds of objects usable for the PDL data include four kinds, that is, characters, image, line drawing, and smooth shade. In this example, as for classification of the object types, three kinds of classification, that is, "characters", "image", and "graphic" are used. The object type of "graphic" includes a line drawing object and a smooth shade object.

The PDL page may include an object of at least one object type of three object types of the characters, the image, and the graphic. An object of characters is referred to as a "character object", an object of image is referred as an "image object", and an object of graphic is referred as a "graphic object".

The PDL page may include page content of picture having plural object types of objects combined therein. The PDL data includes object information identifying the object arranged in the page and layout information identifying an arrangement position of the object. The object information includes information on attributes of the object.

The priority setting unit 18 has a predetermined fixed priority as a default setting (default value). For example, the priority is defined in the default in the order that a priority for the "characters" is the highest, followed by the "image", the "image" followed by the "graphic".

The priority setting can be changed by a user operation via the operation unit 36. In other words, the operator as a user can operate the operation unit 36 to specify the priority. The priority setting unit 18 can change the priority setting in accordance with an instruction from the operation unit 36. The priority setting unit 18 provides information on the priority to the search unit 20.

The search unit 20 is a processing unit performing the search processing for identifying the page before modification corresponding to the page after modification concerning the second document data 50 from among the plural pages in the first document data 40. The search unit 20 determines one kind of object type used in the search processing on the basis of the priority of search defined with respect to the plural object types and by analyzing an object structure of the page after modification included in the second document data 50.

The search unit 20 has an object type determination unit 60. The object type determination unit 60 includes an object structural analysis unit 62 and a search object type decision unit 64. The object structural analysis unit 62 corresponds to a form of "analysis unit".

The object structural analysis unit 62 is a processing unit for analyzing the object structure of the second document data 50 that is the PDL data. The object structural analysis unit 62 analyzes the object included in the PDL page of the second document data 50 in accordance with the priority defined by the priority setting unit 18.

The search object type decision unit 64 defines only one object type of an object used as a search key in the search processing on the basis of an analysis result by the object structural analysis unit 62.

The search unit 20 has an object type search processing unit 70. The object type search processing unit 70 performs the search processing in terms of an object belonging to one kind of object type defined by the search object type decision unit 64. The object type search processing unit 70 includes a character object search unit 72, character object analogy evaluation unit 73, image object search unit 74, image object analogy evaluation unit 75, graphic object search unit 76, and graphic object analogy evaluation unit 77. A combination of the character object analogy evaluation unit 73, the image object analogy evaluation unit 75, and the graphic object analogy evaluation unit 77 corresponds to a form of an "analogy evaluation unit".

The character object search unit 72 performs processing which uses the character object included in the PDL page in the second document data 50 as the search key to find out the page before modification corresponding to the second document data 50 from among the plural pages in the first document data 40. The number of the character object used as the search key may be one or more. The use of the plural character objects as the search keys can improve accuracy of the search.

The character object analogy evaluation unit 73 is an arithmetic unit which compares a character object as the search key with a character object included in the first document data to evaluate the analogy. If the plural character objects meeting a condition on usability as the search key are included within the identical page in the second document data 50, the character object analogy evaluation unit 73 calculates the analogy for each of these plural character objects and totally takes account of the analogies of the plural character objects to evaluate the analogy of the entire page.

The character object search unit 72 finds out a page analogous to the page after modification concerning the second document data 50 from the first document data 40 on the basis of an evaluation result by the character object analogy evaluation unit 73 to identify the analogous page as the "page before modification". The "analogous page" is a page having the highest analogy in the analogy evaluation.

The image object search unit 74 performs processing which uses the image object included in the PDL page in the second document data 50 as the search key to find out the page before modification corresponding to the second document data 50 from among the plural pages in the first document data 40.

The image object analogy evaluation unit 75 is an arithmetic unit which compares an image object as the search key with an image object included in a page of the first document data to evaluate the analogy. If the plural image objects meeting a condition on usability as the search key are included within the identical page in the second document data 50, the image object analogy evaluation unit 75 calculates the analogy for each of these image objects and totally takes account of the analogies of the plural image objects to evaluate the analogy of the entire page.

The image object search unit 74 finds out a page analogous to the page after modification concerning the second document data 50 from among the first document data 40 on the basis of an evaluation result by the image object analogy evaluation unit 75 to identify the analogous page as the "page before modification".

The graphic object search unit 76 performs processing which uses the graphic object included in the PDL page in the second document data 50 as the search key to find out the page before modification corresponding to the second document data 50 from among the plural pages in the first document data 40.

The graphic object analogy evaluation unit 77 is an arithmetic unit which compares a graphic object as the search key with a graphic object included in the first document data to evaluate the analogy.

In comparing the graphic objects, the comparison is performed after an area of each of the graphic objects is converted into a bitmap. The bitmap conversion unit 26 performs processing for converting the data of the PDL page into image data in a bitmap format. The image data in the bitmap format is referred to as "bitmap data", and an image expressed by the bitmap data is referred to as a "bitmap image". The graphic area extraction unit 28 performs processing for extracting the graphic area corresponding to a graphic object portion from the bitmap data. A combination of the bitmap conversion unit 26 and the graphic area extraction unit 28 corresponds to a form of a "graphic area extraction unit".

The graphic object analogy evaluation unit 77 compares the bitmap images of the graphic areas extracted by the graphic area extraction unit 28 with each other to evaluate the analogy. The method for evaluating the analogy between the bitmap images of the graphic areas is the same as the method for evaluating the analogy of the image objects. If the plural graphic objects meeting a condition on usability as the search key are included within the identical page in the second document data 50, the graphic object analogy evaluation unit 77 calculates the analogy for each of these graphic objects and totally takes account of the analogies of the plural graphic objects to evaluate the analogy of the entire page.

The graphic object search unit 76 finds out a page analogous to the page after modification concerning the second document data 50 from among the first document data 40 on the basis of an evaluation result by the graphic object analogy evaluation unit 77 to identify the analogous page as the "page before modification".

The page replacement processing unit 22 performs page replacement processing for replacing the page before modification in the first document data 40 identified by the search unit 20 with the page after modification concerning the second document data 50. The page replacement processing is satisfactory so long as the resultant has content changed into the content of the page after modification, and thus, there are included not only a case where the entire data of the page before modification is completely rewritten with the data of the page after modification but also a case where original data is used for a portion, in the data of the page before modification, which is common to the data of the page after modification and a part of the data corresponding to a difference portion as a difference concerning a modified portion is rewritten. The page replacement processing unit 22 corresponds to a form of a "replacement unit".

Once the page replacement processing is performed by the page replacement processing unit 22, the first document data 40 after having been subjected to the page replacement processing is stored in the first document data storage unit 12. The configuration may be such that, in storing the first document data 40 after having been subjected the page replacement processing, the first document data 40 is saved with the file before being subjected to the page replacement being overwritten, or the file before being subjected to the page replacement is remained and the first document data 40 after having been subjected to the page replacement processing is saved.

The difference detection unit 30 is a processing unit for detecting a difference between an object included in the page after modification and an object included in the page before modification by comparing the page after modification that is to be subjected to the page replacement processing by the page replacement processing unit 22 with the page before modification in the first document data, each page being in a state of an object of the page description data written by the page description language.

The display control unit 32 controls screen displaying of the display unit 38. In other words, the display control unit 32 performs display control for controlling the display unit 38 to display various pieces of information. The display control unit 32 controls the display unit 38 to display information on the difference detected by the difference detection unit 30.

The user interface (UI) control unit 34 controls input processing coming from the operation unit 36 and output processing output to the display unit 38. A display device used for the display unit 38 includes a liquid crystal display, an organic EL (Electro-Luminescence) display or the like. The display unit 38 is a device which provides the information to the operator through displaying on the screen. The operation unit 36 is an input device for accepting the user operation. Various input devices may be used for the operation unit 36 such as a keyboard, mouse, touch panel, and trackball, and a proper combination of these may be used.

The operator can input various pieces of information using the operation unit 36.

Figure 2:
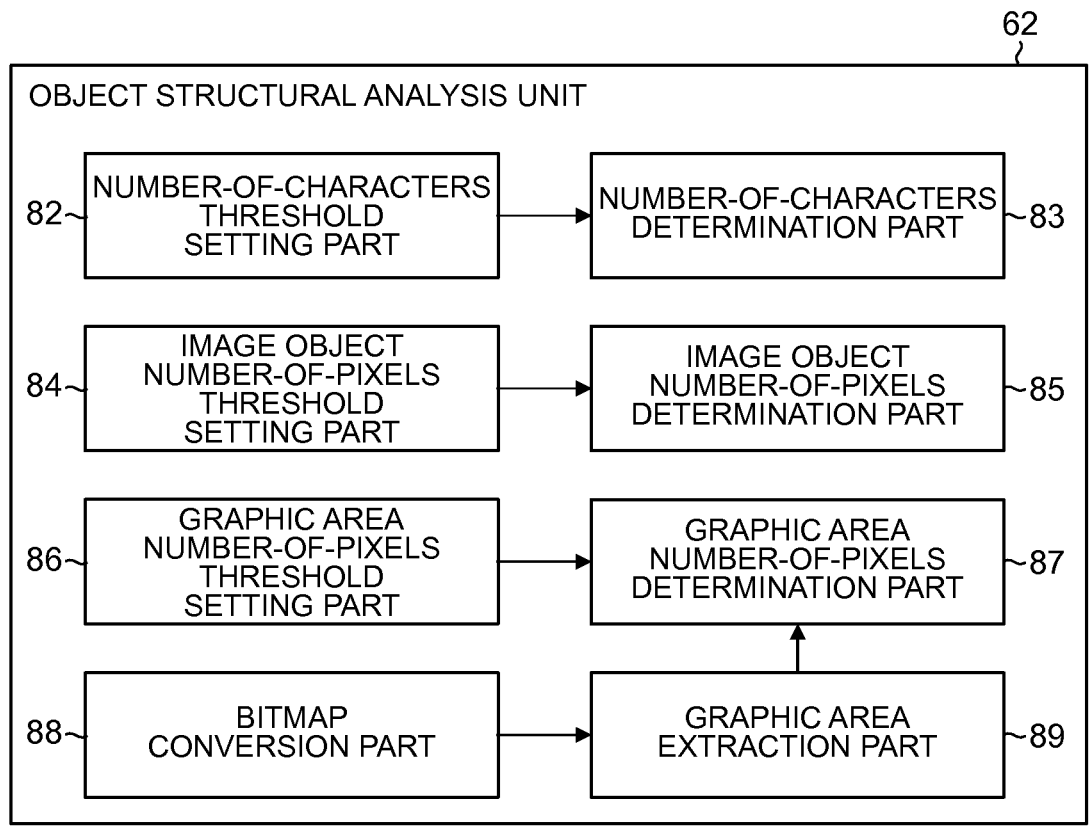
FIG. 2 is a block diagram showing a detailed configuration of an object structural analysis unit.

FIG. 2 is a block diagram showing a detailed configuration of the object structural analysis unit 62. The object structural analysis unit 62 includes a number-of-characters threshold setting part 82, number-of-characters determination part 83, image object number-of-pixels threshold setting part 84, image object number-of-pixels determination part 85, graphic area number-of-pixels threshold setting part 86, graphic area number-of-pixels determination part 87, bitmap conversion part 88, and graphic area extraction part 89.

The number-of-characters threshold setting part 82 sets a threshold regarding the number of characters that is a criterion for determining whether or not the search is performed on the basis of the characters. The threshold regarding the number of characters is referred to as a "number-of-characters threshold". The number-of-characters threshold is a value defining a lower limit on the number of characters of the character string which can be used for the search on the basis of the character object. In other words, the character object meeting a condition where the number of characters thereof is equal to or more than the number-of-characters threshold can be used as the search key. The number-of-characters threshold corresponds to a "first threshold".

The number-of-characters threshold has a default setting value defined in advance by a program. Instead of or in combination with setting the number-of-characters threshold by way of such a default setting value, the number-of-characters threshold can be set to a desired value or changed on the basis of the user operation coming from the operation unit 36.

The number-of-characters determination part 83 determines whether or not there exists the character object having the character string equal to or more than the number-of-characters threshold in the page after modification.

The image object number-of-pixels threshold setting part 84 sets a threshold regarding the number of pixels that is a criterion for determining whether or not the search is performed on the basis of the image. The threshold regarding the number of pixels of the image object is referred to as an "image object number-of-pixels threshold". The image object number-of-pixels threshold is a value defining a lower limit on the number of pixels of the image object required when the search on the basis of the image object is performed. In other words, the image object meeting a condition where the number of pixels thereof is equal to or more than the image object number-of-pixels threshold can be used as the search key. The image object number-of-pixels threshold corresponds to a "second threshold".

The image object number-of-pixels threshold has a default setting value defined in advance by a program. Instead of or in combination with setting the image object number-of-pixels threshold by way of such a default setting value, the image object number-of-pixels threshold can be set to a desired value or changed on the basis of the user operation coming from the operation unit 36.

The image object number-of-pixels determination part 85 determines whether or not there exists the image object having the number of pixels equal to or more than the image object number-of-pixels threshold in the page after modification.

The graphic area number-of-pixels threshold setting part 86 sets a threshold regarding the number of pixels that is a criterion for determining whether or not the search is performed on the basis of the graphic. The threshold regarding the number of pixels in the graphic area is referred to as a "graphic area number-of-pixels threshold". The graphic area number-of-pixels threshold is a value defining a lower limit on the number of pixels in the graphic area required when the search on the basis of the graphic is performed. In other words, the graphic object meeting a condition where the number of pixels thereof is equal to or more than the graphic area number-of-pixels threshold can be used as the search key.

The graphic area number-of-pixels threshold has a default setting value defined in advance by a program. Instead of or in combination with setting the graphic area number-of-pixels threshold by way of such a default setting value, the graphic area number-of-pixels threshold can be set to a desired value or changed on the basis of the user operation coming from the operation unit 36.

The graphic area number-of-pixels determination part 87 determines whether or not there exists the graphic area having the number of pixels equal to or more than the graphic area number-of-pixels threshold in the page after modification.

The bitmap conversion part 88 performs processing for converting the PDL data of the page after modification into the image data in the bitmap format. The graphic area extraction part 89 performs processing for extracting the graphic area that is a bitmap area corresponding to part of the graphic object from the bitmap data generated by the bitmap conversion part 88.

The bitmap conversion part 88 and the graphic area extraction part 89 shown in FIG. 2 may be respectively the same as the bitmap conversion unit 26 and graphic area extraction unit 28 illustrated in FIG. 1, or the identical configurations may be used between them respectively. A combination of the bitmap conversion unit 26 and the graphic area extraction unit 28, and a combination of the bitmap conversion part 88 and the graphic area extraction part 89 function to create a bitmap of an area containing at least the graphic object from the page of the document data of at least one of the first document data 40 and the second document data 50, and extract the bitmap area corresponding to the graphic object.

The object structural analysis unit 62 shown in FIG. 2 performs the determinations step by step by the number-of-characters determination part 83, the image object number-of-pixels determination part 85, and the graphic area number-of-pixels determination part 87 in accordance with the priority defined by the priority setting unit 18 illustrated in FIG. 1.

For example, in a case where the priority is defined in the order of characters, image, and graphic in descending order of the priority of search, first, the number-of-characters determination part 83 determines whether or not there exits the character object having the character string equal to or more than the number-of-characters threshold that is the first threshold. If the character object having the character string equal to or more than the number-of-characters threshold exists in the page after modification, the number-of-characters determination part 83 notifies the search object type decision unit 64 (see FIG. 1) of determination information indicating that there exits the character object meeting the condition of the character string equal to or more than the number-of-characters threshold. The search object type decision unit 64 determines a "character" object type as a kind of object type used for the search on the basis of the determination information obtained from the number-of-characters determination part 83. In this case, determination processing on the image and the graphic which are lower in the priority than the characters may be omitted, the determination processing on the image and the graphic being made by the image object number-of-pixels determination part 85 and the graphic area number-of-pixels determination part 87, respectively.

If the character object having the character string equal to or more than the number-of-characters threshold does not exist in the page after modification, the image object number-of-pixels determination part 85 determines whether or not there exists the image object having the number of pixels equal to or more than the image object number-of-pixels threshold that is the second threshold. If the image object having the number of pixels equal to or more than the image object number-of-pixels threshold exists in the page after modification, the image object number-of-pixels determination part 85 notifies the search object type decision unit 64 (see FIG. 1) of determination information indicating that there exists the image object meeting the condition of the number of pixels equal to or more than the image object number-of-pixels threshold. The search object type decision unit 64 determines an "image" object type as a kind of object type used for the search on the basis of the determination information obtained from the image object number-of-pixels determination part 85. In this case, the determination processing on the graphic which is lower in the priority than the image may be omitted, the determination processing on the graphic being made by the graphic area number-of-pixels determination part 87.

If the character object having the character string equal to or more than the number-of-characters threshold does not exist and the image object having the number of pixels equal to or more than the image object number-of-pixels threshold does not exist in the page after modification, the search by way of the graphic is inevitably performed.

Therefore, in a case where the priority for the graphic is set to the lowest order, the determination processing by the graphic area number-of-pixels determination part 87 can be omitted. In a case of a configuration where the priority for the graphic is fixed to the lowest order, the graphic area number-of-pixels threshold setting part 86 and the graphic area number-of-pixels determination part 87 may be omitted in the configuration.

Figure 3:
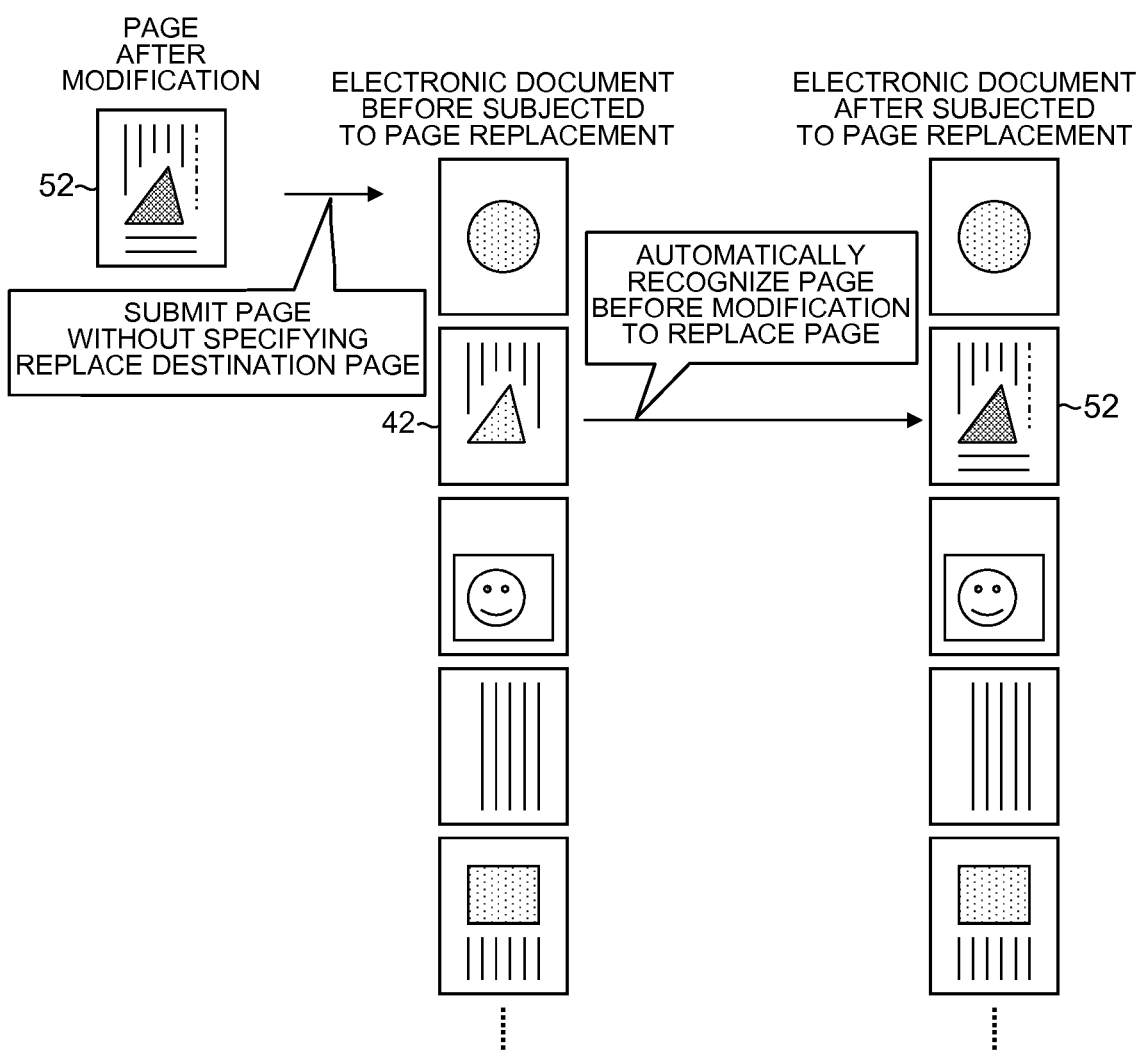
FIG. 3 is an illustration diagram showing an outline of an automatic page replacement function attained in the embodiment.

FIG. 3 is an illustration diagram showing an outline of an automatic page replacement function attained in the embodiment. The "page replacement" refers to that a part of pages of the electronic document (written document) having plural pages is modified and replaced in units of pages.

In the embodiment, submitted is an electronic document representing content of a page 52 after modification concerning a page 42 that is one page in the electronic document before being subjected to the page replacement. The "electronic document before being subjected to the page replacement" corresponds to the first document data 40 illustrated in FIG. 1, and is stored in the first document data storage unit 12. The "page 52 after modification" shown in FIG. 3 corresponds to the second document data 50 illustrated in FIG. 1.

In FIG. 3, the page 52 after modification is illustrated as an electronic document obtained by modifying the content of the second page (page number=2) that is the page 42 in the electronic document before being subjected to the page replacement. The page 42, the second page, corresponds to the "page before modification". The operator submits the electronic document of the page 52 after modification without specifying a replace destination page.

Once the page 52 after modification is submitted, a page before modification (here, the page 42 that is the second page) corresponding to the page 52 after modification is automatically recognized from among the electronic document before being subjected to the page replacement and the processing is performed for replacing the page before modification (reference numeral 42) with the page 52 after modification.

A function to automatically recognize the page before modification 42 corresponding to the submitted page 52 after modification to replace the pages is an "automatic page replacement function".

Figure 4:
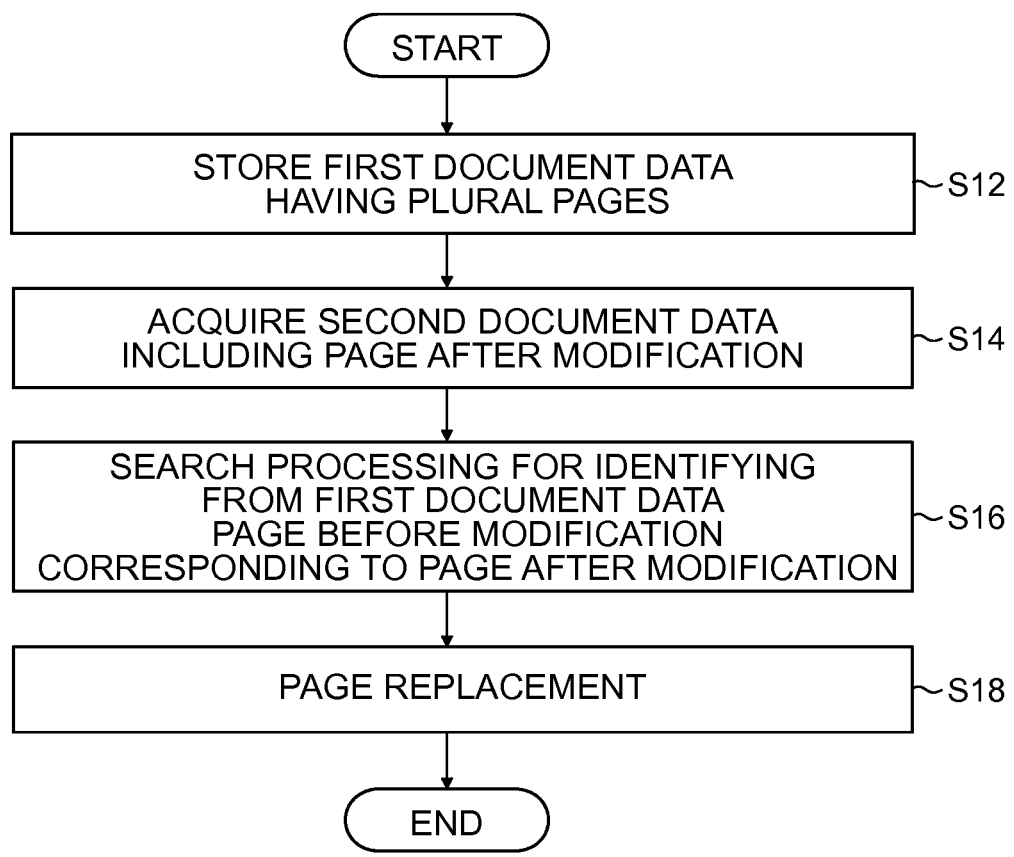
FIG. 4 is a flowchart showing a procedure of an automatic page replacement method according to the embodiment of the invention.

FIG. 4 is a flowchart showing a procedure of the automatic page replacement method according to the embodiment of the invention. Each step from step S12 to step S18 shown in FIG. 4 is implemented through the processing performed by the information processor 10 (see FIG. 1).

First, the first document data 40 having the plural pages is stored in the first document data storage unit 12 (at step S12 in FIG. 4). Step S12 corresponds to a form of a "storage step". A function to store the first document data 40 in the first document data storage unit 12 corresponds to a form of "storage function".

Subsequently, the information processor 10 (see FIG. 1) acquires the second document data 50 including the page after modification (at step S14 in FIG. 4). Step S14 corresponds to a form of a "data acquisition step". A function to acquire the second document data 50 corresponds to a form of "data acquisition function".

Next, the search unit 20 (see FIG. 1) performs the search processing for identifying from the first document data 40 the page before modification corresponding to the page after modification (at step S16 in FIG. 4). Step S16 corresponds to a form of a "search step". A function to perform the search processing shown at step S16 corresponds to a "search function".

Next, the page replacement processing unit 22 (see FIG. 1) performs the page replacement processing for replacing the page before modification in the first document data 40 which is identified in the search step (step S16 in FIG. 4) with the page after modification (at step S18 in FIG. 4). Step S18 corresponds to a form of a "replacement step". A function to perform the page replacement processing corresponds to a form of a "replacement function". The order of step S12 and step S14 in FIG. 4 may be inversed.

Figure 5:
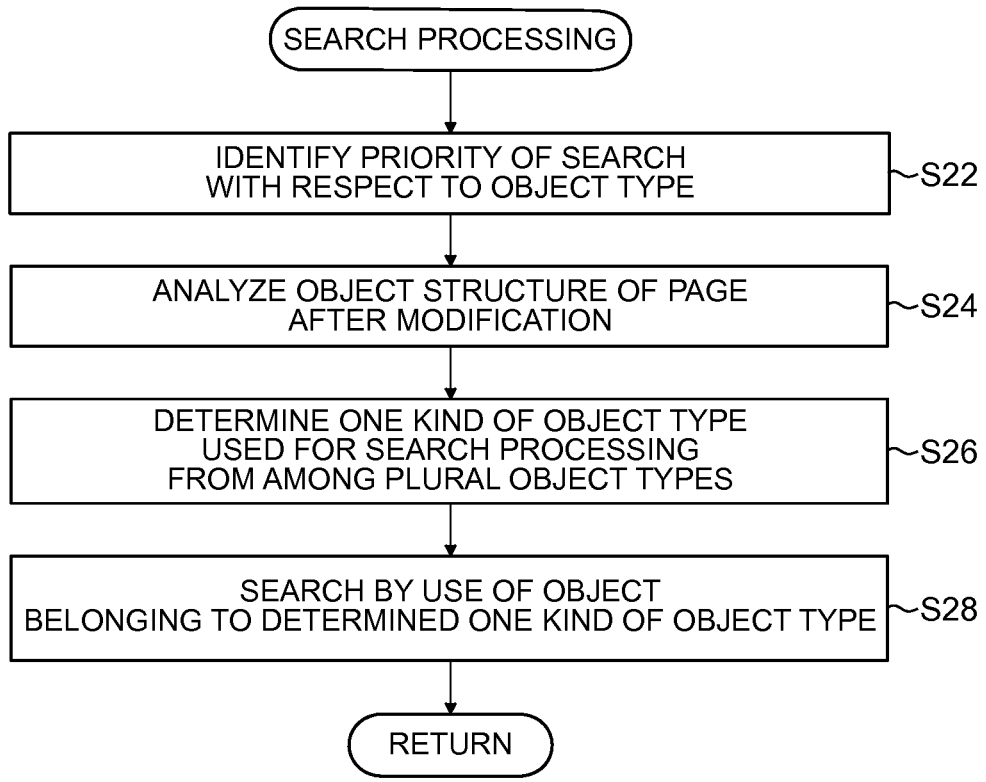
FIG. 5 is flowchart showing content of search processing.

FIG. 5 is a flowchart showing content of the search processing shown at step S16 in FIG. 4.

As shown in FIG. 5, the search processing includes a step of identifying the priority of search with respect the object type (step S22), a step of analyzing the object structure of the page after modification (step S24), a step of determining one kind of object type used for the search processing from among the plural object types (step S26), and step of searching by use of an object belonging to the determined one kind of object type (step S28).

Step S22 is performed in accordance with the priority setting set by the priority setting unit 18 illustrated in FIG. 1. Step S24 in FIG. 5 is performed by the object structural analysis unit 62 illustrated in FIG. 1 and FIG. 2. Determined is whether or not there exists an object meeting a condition on usability as the search key in the page after modification, in descending order of high priority object type in accordance with the defined priority of search.

At step S26 in FIG. 5, one kind of object type used for the search processing is determined on the basis of the analysis result from step S24. The step at step S26 corresponds to a form of an "object type determination step". A function to determine the object type corresponds to a form of an "object type determination function".

At step S28, searching is performed using as the search key an object belonging to one kind of object type determined at step S26. The step at step S28 corresponds to a form of an "object type search processing step". A function to perform the search processing using the object belonging to one kind of object type corresponds to a form of an "object type search processing function".

Figure 6:
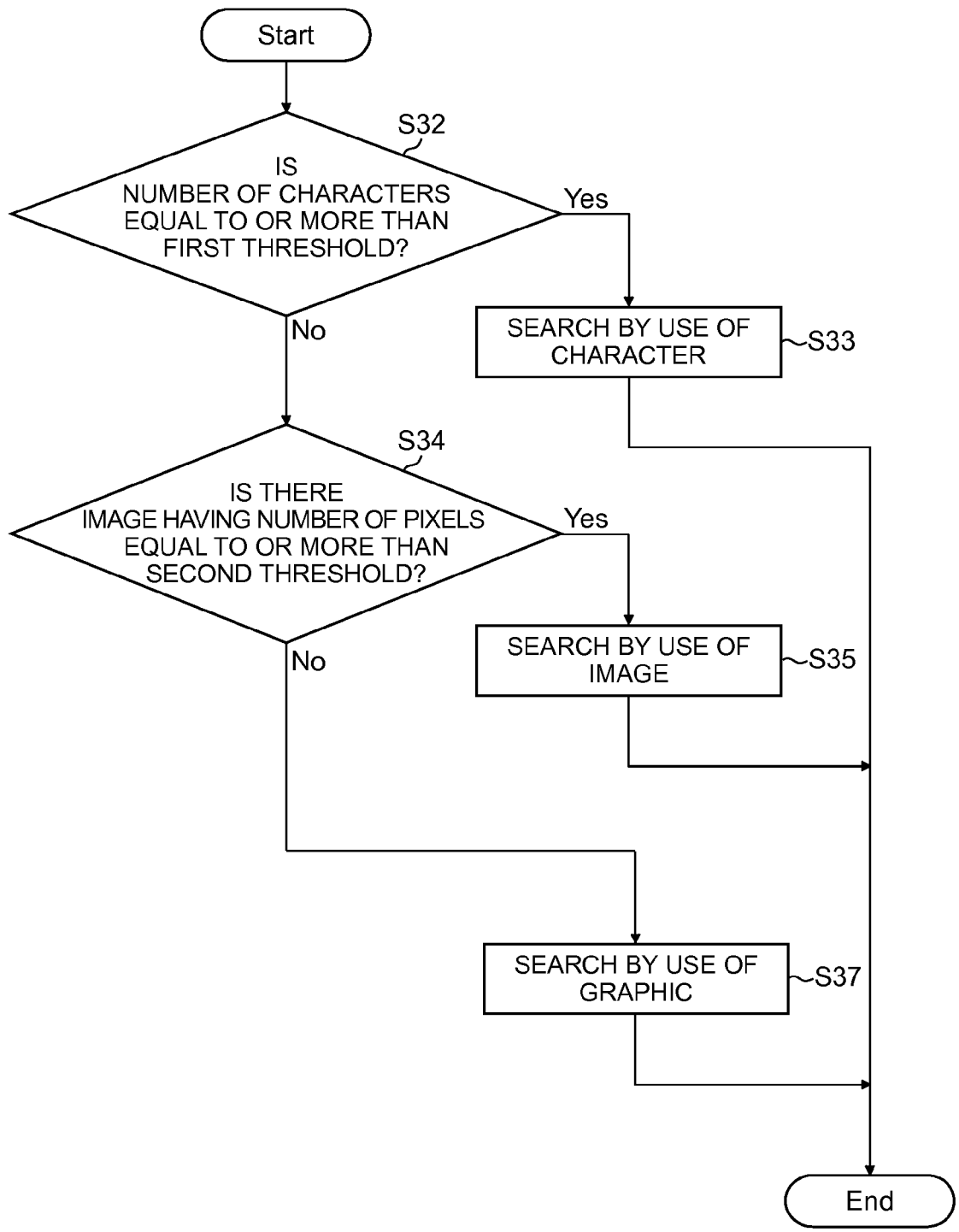
FIG. 6 is a flowchart showing a concreate example of the search processing.

FIG. 6 is a flowchart showing a concreate example of the search processing. Here, a description is given of a case where the priority of search is defined in the order of characters, image, and graphic, as an example.

First, determined is whether or not there exists the character object including characters the number of which is equal to or more than the first threshold in the submitted page after modification (step S32). If the object of the character string having characters the number of which is equal to or more than the first threshold exists in the page after modification, Yes determination results at step S32 and the search by use of the character is performed (step S33).

The search step by use of the characters (step S33) performs processing for finding out the analogous page including a character object analogous to the character object as the search key from among the plural pages in the first document data 40, using as the search key the character object of the character string having characters the number of which is equal to or more than the first threshold. The "analogous page" referred here is identified as the "page before modification" corresponding to the page after modification.

The determination of the analogy only on the object of the character string having characters the number of which is equal to or more than the first threshold allows search assurance to be improved.

The search by use of the character can determine the analogy in a high speed and accurately as compared with the search by use of the image and the search by use of the graphic. Therefore, as for the priority setting, it is preferable that the priority of search by use of the character is set to the highest.

If at step S32, the object of the character string having characters the number of which is equal to or more than the first threshold does not exist in the page after modification, No determination results at step S32 and the process proceeds to step S34.

At step S34, determined is whether or not there exists the image object having pixels the number of which is equal to or more than the second threshold in the page after modification. If the image object having pixels the number of which is equal to or more than the second threshold exists in page after modification, Yes determination results at step S34, and the search by use of the image is performed (step S35).

The step of the search by use of the image (step S35) performs processing for finding out the analogous page including an image object analogous to the image object as the search key from among the plural pages in the first document data 40, using as the search key the image object having pixels the number of which is equal to or more than the second threshold.

The determination of the analogy only on the image object having pixels the number of which is equal to or more than the second threshold allows the analogy to be accurately determined.

If at step S34, the image object having pixels the number of which is equal to or more than the second threshold does not exist in page after modification, No determination results at step S34 and the process proceeds to step S37.

Step S37 performs the search by use of the graphic. The search by use of the graphic (step S37) converts a portion of the graphic object into image data in the bitmap format, that is, makes it into an image by way of the RIP, and then determines the analogy as a bitmap image.

The search by use of the graphic requires the RIP processing to take a processing time more than the search by use of the character (step S33) and the search by use of the image (step S35). Therefore, it is preferable that the priority of the search by use of the graphic is set to be lower than the search by use of the image.

Next, a description is given of a digital plate inspection function in the information processor 10.

The digital plate inspection refers to that two pages are compared on a monitor to confirm the changed portion. The digital plate inspection of related art has used a method in which the entire PDL page is subjected to the RIP processing to compare the bitmaps of the page before modification and page after modification. However, the digital plate inspection of related art like this can detect the changed portion, but has a defect in that content of change in a PDL object attribute cannot be confirmed. Examples of the "content of change in a PDL object attribute" include those where an RGB image is changed to a CMYK image, for example. In the method of the digital plate inspection of related art, a difference involved by changing a color coordinate system (color space) for the image object had been difficult to grasp.

Further, in the method of the digital plate inspection of related art, since the entire page is subjected to the RIP processing and the bitmap image of the entire page is compared, a slightly changed portion of an object within the page is detected as a large difference in the bitmap image in some cases.

For example, in a case where insertion or deletion of the characters causes a linefeed in the character string or the like to shift the entire character string, the whole thereof is detected as a difference.

In order to deal with such a problem, in the embodiment, two pages to be compared are subjected to the digital plate inspection with the pages being in a state of a PDL object. According to the digital plate inspection method in the embodiment, in addition to detection of the changed portion, how the attribute in a state of the PDL object is changed can be confirmed. Even when a slight change such as insertion or deletion of the characters causes entirely shift, only a portion actually changed can be detected. Further, according to the digital plate inspection method in the embodiment, the comparison can be performed with a viewpoint being specified. For example, the comparison may be made with the object type being limited, such as comparison of only the characters, or comparison of only the images.

Figure 7:
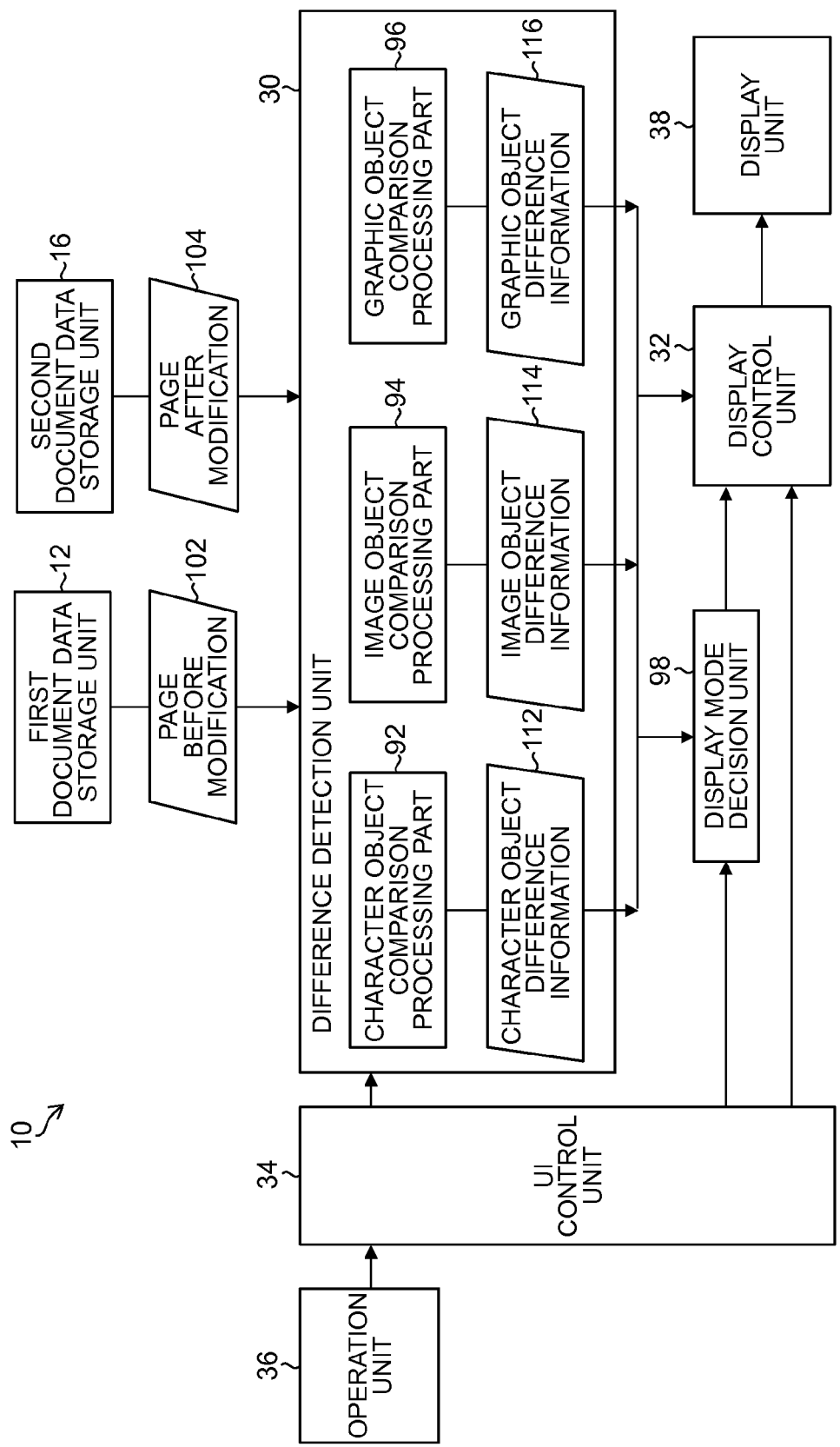
FIG. 7 is a block diagram showing a main part configuration of an information processor having a digital plate inspection function.

FIG. 7 is a block diagram showing a main part configuration of the information processor 10 having the digital plate inspection function. Elements in FIG. 7 the same as those illustrated in FIG. 1 are designated by the same reference numerals, and the description thereof is omitted.

The difference detection unit 30 includes a character object comparison processing part 92, image object comparison processing part 94, and graphic object comparison processing part 96. The information processor 10 includes a display mode decision unit 98.

The difference detection unit 30 performs processing for retrieving data of the page before modification 102 from the first document data storage unit 12 and retrieving data of the page after modification 104 from the second document data storage unit 16, and then comparing both pages to detect a difference between both pages. The difference detection unit 30 can determine whether or not a difference exists for every objects included in the pages to create difference information for each object.

The character object comparison processing part 92 compares the page before modification 102 with the page after modification 104 with the pages being in a state of the PDL object to create character object difference information 112. The character object difference information 112 is information indicating a difference, that is a different point, between the character object included in the page before modification 102 and the character object included in the page after modification 104. The character object difference information 112 may include information indicating difference in content of the character string, information indicating difference in appearance, and information indicating difference in the attribute such as a font.

The image object comparison processing part 94 compares the page before modification 102 with the page after modification 104 with the pages being in a state of the PDL object to create image object difference information 114. The image object difference information 114 is information indicating a difference, that is a different point, between the image object included in the page before modification 102 and the image object included in the page after modification 104. The image object difference information 114 may include information indicating difference in content of the image, and information indicating difference in the attribute such as an image size. The attribute of image may include, besides the image size, resolution, compression method, color space, and the like.

The graphic object comparison processing part 96 compares the page before modification 102 with the page after modification 104 to create graphic object difference information 116. In comparing the graphic objects, data converted into the bitmap image is compared.

The display mode decision unit 98 specifies a display mode for displaying the page before modification 102 and the page after modification 104 on the screen of the display unit 38 in the digital plate inspection function. The information processor 10 in this example has three display modes an "arrange all display", "toggle display", and "differential intensified display" as the display mode for the digital plate inspection.

The "arrange all display" mode is a display form where both the page after modification 104 and the page before modification 102 are arranged on one screen at a time to be displayed. The "toggle display" mode is a display form where the page after modification 104 and the page before modification 102 are alternately toggled to be displayed. The display in the "toggle display" mode is toggled automatically or in concert with the user operation. In a case where two pages are automatically toggled and displayed, it is preferable for the user to arbitrarily specify or select setting for a time interval of display toggling.

The "differential intensified display" mode is a display form where a differential between the page after modification 104 and the page before modification 102 is visually intensified to be displayed. A "differential" is synonymous with a "difference". As a method of the intensified display, for example, highlighted display, blinked display or enlarged display, or a proper combination to these may be used.

The "arrange all display" mode corresponds to a "first mode", the "toggle display" mode corresponds to a "second mode", and the "differential intensified display" mode corresponds to a "third mode". The display mode may include at least one kind of mode, but preferably is configured to have a plurality of display modes including at least two display modes selected from above three kinds of mode.

The display mode decision unit 98 can set the display mode in accordance with the user operation from the operation unit 36. The display mode decision unit 98 performs processing for automatically decide a default display mode from among three kinds of display mode. The default display mode is automatically changed depending on a magnitude of the differential between two compared pages. For example, in a case where the differential between two pages is large to an extent where different points between the pages is relatively easy to grasp, the "arrange all display" mode is set. In a case where the differential between two pages is small to an extent where different points between the pages is hard to see at first glance, the "differential intensified display" mode is set. The default display mode decided by the display mode decision unit 98 can be changed by the user operation from the operation unit 36.

Figure 8:
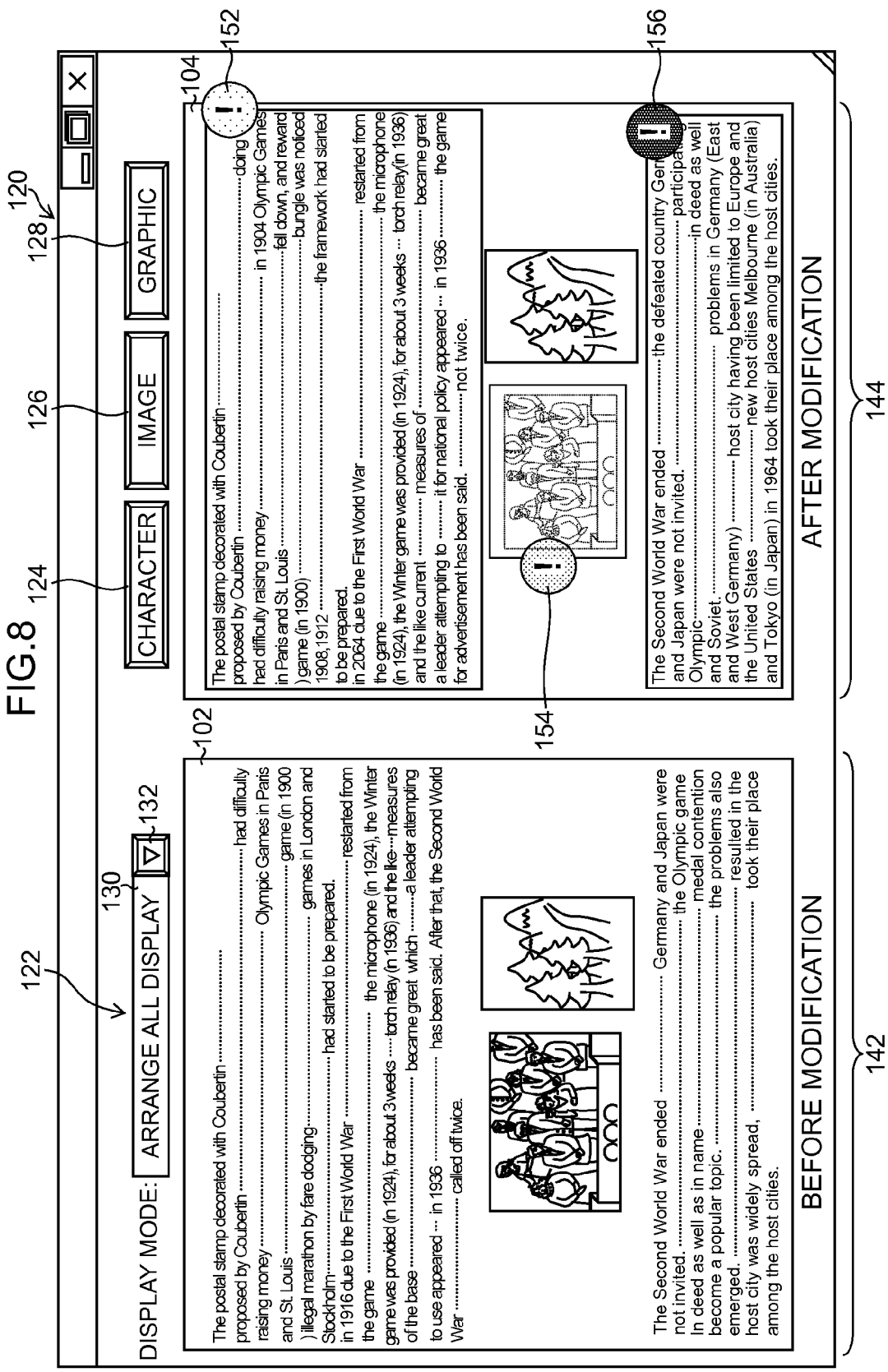
FIG. 8 is an illustration showing an exemplary GUI (Graphical User Interface) for a comparison screen by way of a display mode of "arrange all display"

FIG. 8 is an exemplary GUI (Graphical User Interface) of a comparison screen in the display mode "arrange all display". A display window 120 includes a display mode selection field 122, character object type specifying button 124, image object type specifying button 126, and graphic object type specifying button 128. The term "button" means a GUI button. Actions expressed by "press" with respect to the GUI button include an action for inputting an instruction corresponding to the button such as clicking, touching, or mousing over.

The display mode selection field 122 includes a mode type display box 130 and a pull-down button 132. The mode type display box 130 is a display field that displays mode type information indicating the kind of display mode currently selected. The pull-down button 132 is a button for displaying available choices for the display mode. When the pull-down button 132 is pressed, a pull-down menu (not shown) containing the available choices for the display mode is displayed. The operator can perform an operation selecting the display mode from the pull-down menu to change the display mode.

In the case of the display mode "arrange all display", as shown in FIG. 8, print image content of the page before modification 102 and print image content of the page after modification 104 are arranged on the screen at a time to be displayed. In FIG. 8, a left area in the display window 120 is a page-before-modification display area 142 that displays the image of the page before modification 102, and a right area is a page-after-modification display area 144 that displays the image of the page after modification 104. The page-before-modification display area 142 and the page-after-modification display area 144 may be displayed in a form of being replaced with each other in terms of right and left positions thereof. The page before modification 102 and the page after modification 104 may also be displayed in a form of being vertically arranged.

When the page after modification 104 is compared with the page before modification 102, if differences between the objects are detected, icons 152, 154, and 156 are displayed at sites on the objects where the differences are found. Once any of the icons 152, 154, and 156 is pressed, detailed display is performed where detailed information on the difference (differential) is displayed.

The display form of each of the icons 152, 154, and 156 is changed depending on the magnitude of the difference (differential) of the object. Examples of the icon display form changed include an aspect where a color of the icon is changed, or an aspect where the design itself of the icon is changed, or a combination of these. For example, an aspect may be used in which the color of the icon is switched over to "blue", "yellow", and "red" depending on a degree of the differential. There is an aspect where the "blue" icon is displayed at the changed portion having a relatively small differential, the "red" icon is displayed at the changed portion having a relatively large differential, and the "yellow" icon is displayed at the changed portion having a middle level differential. In contrast, since the smaller the differential, the harder to see the difference point, the "red" icon as intensifying color for alerting the operator is displayed at the changed portion having the small differential.

The character object type specifying button 124, the image object type specifying button 126, and the graphic object type specifying button 128 each are a GUI button for specifying the viewpoint for the object type to be compared. The character object type specifying button 124 is a button operated when the comparison is performed with the viewpoint being limited to the character object. Once the character object type specifying button 124 is pressed, the comparison of only the character object is enabled.

The image object type specifying button 126 is a button operated when the comparison is performed with the viewpoint being limited to the image object. Once the image object type specifying button 126 is pressed, the comparison of only the image object is enabled.

The graphic object type specifying button 128 is a button operated when the comparison is performed with the viewpoint being limited to the graphic object. Once the graphic object type specifying button 128 is pressed, the comparison of only the graphic object is enabled.

Figure 9:
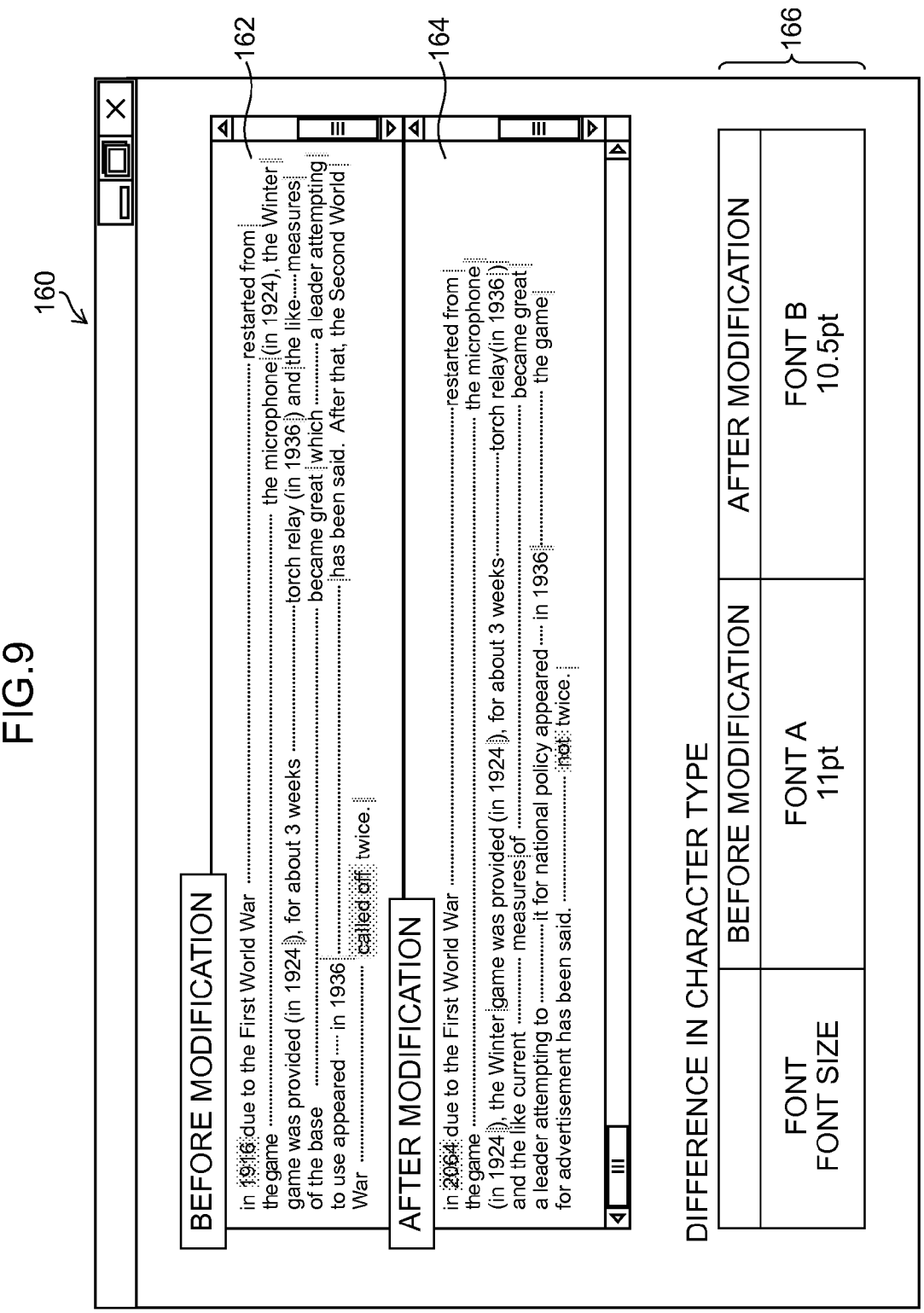
FIG. 9 is an illustration showing an exemplary detailed comparison screen regarding a character object.

FIG. 9 is an exemplary detailed comparison screen regarding the character object. When the icon 152 illustrated in FIG. 8 is clicked or moused over, a character detailed comparison window 160 is displayed as a screen that displays the detailed information on the differential regarding the character object corresponding to the icon 152 as shown in FIG. 9.

The character detailed comparison window 160 includes a character string-before-modification display area 162, character string-after-modification display area 164, and attribute comparison display area 166. The character string-before-modification display area 162 is a display field that displays the character string of the character object included in the page before modification 102 (see FIG. 8). The character string-after-modification display area 164 is a display field that displays the character string of the character object included in the page after modification 104 (see FIG. 8). In this example, the character string-before-modification display area 162 and the character string-after-modification display area 164 are vertically arranged. However, an aspect may be used in which the character string-before-modification display area 162 and the character string-after-modification display area 164 are displayed in a form of being replaced with each other in terms of up and down positions thereof, or are horizontally arranged.

The character string before modification displayed in the character string-before-modification display area 162 and the character string after modification displayed in the character string-after-modification display area 164 are compared to each other, and a different portion in the character string, that is, a portion of the difference, is highlighted to be displayed. The highlighted display intensifies the different point to allow the operator to be alerted.

The attribute comparison display area 166 is an area that displays information on a difference in a character type between before modification and after modification in a compared fashion. As the difference in the character type, information on a font name and a font size is displayed here.

As other information on the difference in the character type, at least one piece of information on a color of the character, bold type, and italic type can be displayed, not shown in FIG. 9.

The comparison display like this by the character detailed comparison window 160 facilitates that the operator confirms the different point between the character objects before and after modification.

Figure 10:
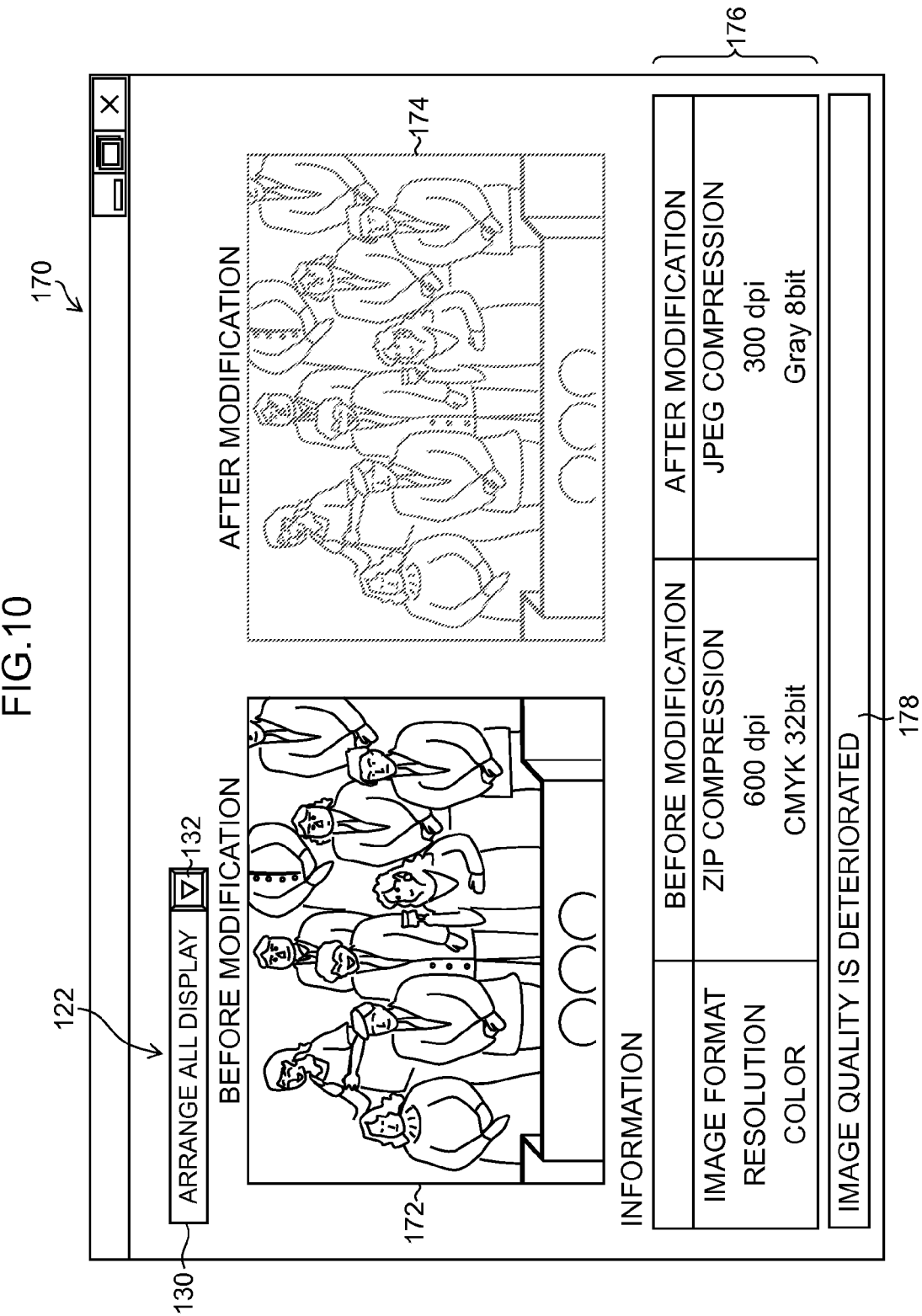
FIG. 10 is an illustration showing an exemplary detailed comparison screen for images.

FIG. 10 is an exemplary detailed comparison screen for the images. When the icon 154 illustrated in FIG. 8 is clicked or moused over, an image detailed comparison window 170 is displayed as a screen that displays the detailed information on the differential regarding the image object corresponding to the icon 154 as shown in FIG. 10.

The image detailed comparison window 170 includes an image-before-modification display area 172, image-after-modification display area 174, attribute comparison display area 176, and warning display area 178.

The image-before-modification display area 172 is a display field that displays the image object included in the page before modification 102 (see FIG. 8). The image-after-modification display area 174 is a display field that displays the image object included in the page after modification 104 (see FIG. 8). In this example, the image-before-modification display area 172 and the image-after-modification display area 174 are horizontally arranged. However, an aspect may be used in which the image-before-modification display area 172 and the image-after-modification display area 174 are displayed in a form of being replaced with each other in terms of right and left positions thereof, or are vertically arranged.

The attribute comparison display area 176 is an area that displays information on a difference in the attribute of the image object between before modification and after modification in a compared fashion. As the difference in the attribute of the image object, information of an image format, the resolution, and the color coordinate system is displayed here.

The warning display area 178 is a display field that displays messages for alerting the operator.

The comparison display like this by the image detailed comparison window 170 facilitates that the operator confirms the different point between the image objects before and after modification.

FIG. 10 is the exemplary detailed comparison display for the image object, but detailed comparison display for the graphic object can be also performed using the same detailed comparison display as in FIG. 10.

[Object Comparison Method]

Here, a description is given of an object comparison method. In the case of searching the "page before modification" corresponding to the page after modification concerning the second document data 50 from among the plural pages in the first document data 40 (see FIG. 1), the objects is compared according to rules 1 and 2 shown below to find out the analogous page.

[Rule 1] Between two pages compared with each other, objects located within the pages are compared which are of the same object type and have coordinates the closest to each other to calculate the analogy between the objects.

[Rule 2] Concerning one of two PDL pages compared with each other, which has the larger number of the objects of the same object type, the analogy is calculated for all objects of the same object type according to the rule 1 and a value of a sum of the respective calculated analogies of the objects is set to the analogy of the entire page.

Figure 11:
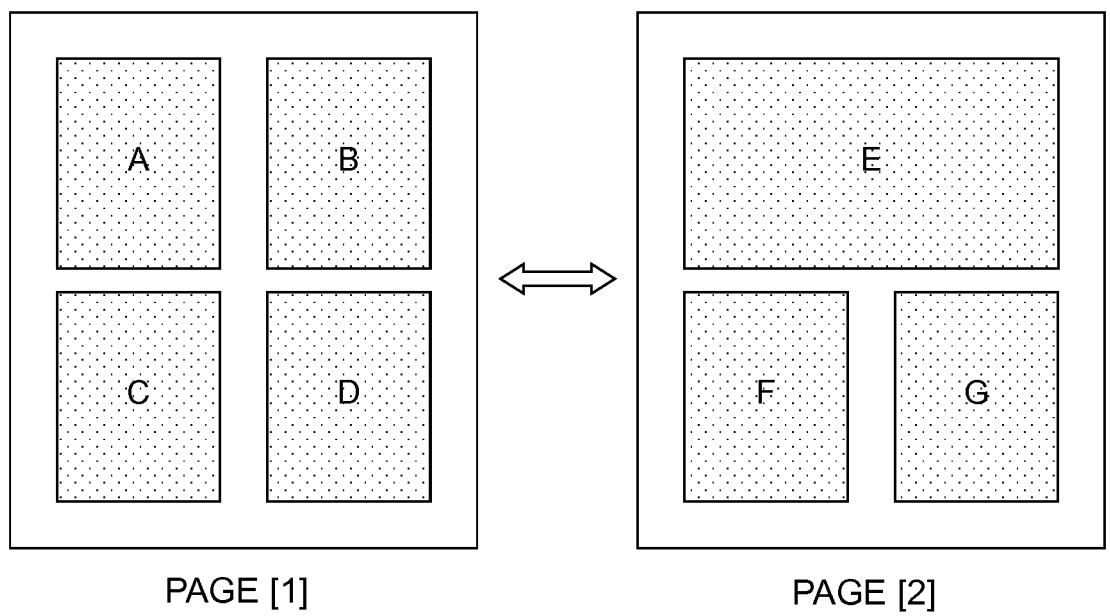
FIG. 11 is an illustration diagram of an object comparison method common to all object types.

A concrete example shown in FIG. 11 is used to describe the comparison method on the basis of the rule 1 and the rule 2. A page [1] shown on the left side and a page [2] shown on the right side in FIG. 11 are two pages compared with each other.

It may be construed that the page [1] is the page included in the first document data 40 and the page [2] is the page included in the second document data 50, and, in contrast, it may be construed that the page [1] is the page included in the second document data 50 and the page [2] is the page included in the first document data 40.

The page [1] has four objects designated by A, B, C, and D. The page [2] has three object designated by E, F, and G. For the purpose of the simple explanation here, assume that all the objects designated by the reference characters A to G belong to the same object type. For example, assume that all the objects designated by the reference characters A to G are the "characters" object. Assume that each of the objects designated by the reference characters A to G meets the condition that the value of the object is equal to or more than the "number-of-characters threshold", the "image object number-of-pixels threshold", or the "graphic area number-of-pixels threshold" defined corresponding to the object type.

In paying attention to the object A located in the page [1], the object, of the objects E to G located in the page [2], which is of the same object type and the closest to the coordinates of the object A in the page [1] is the object E. The coordinates of the object on the page represent the arrangement position of the object.

A combination of the object A and the object E corresponds to the objects which are of the same object type and have coordinates the closest to each other in each page.

Similarly, a combination of the object B and the object E, a combination of the object C and the object F, and a combination of the object D and the object G each correspond to the objects which are of the same object type and have coordinates the closest to each other in each page.

According to the rule 1, the object A and the object E are compared with each other to calculate an analogy $S_{AE}$.

According to the rule 2, similarly, the object B and the object E are compared with each other to calculate an analogy $S_{BE}$, the object C and the object F are compared with each other to calculate an analogy $S_{CF}$, and the object D and the object G are compared with each other to calculate an analogy $S_{DG}$.

Then, these calculated analogies a value of a sum of $S_{AE}$, $S_{BE}$, $S_{CF}$, and $S_{DG}$, that is, "$S_{AE}+S_{BE}+S_{CF}+S_{DG}$" is set to the analogy of the entire page. If the analogy of the entire page is represented by $S_P$, "$S_P=S_{AE}+S_{BE}+S_{CF}+S_{DG}$".

The same goes for a case where all the objects designated by the reference characters A to G are the "image" objects, or the "graphic" objects.

[Comparison Method for Each Object Type]

Next, a description is given of the comparison method for each object type.

<Comparison Method for Character String>

The comparison method for the character string includes comparison of content of the character string and comparison of appearance of the character string.

Figures 12A, 12B:
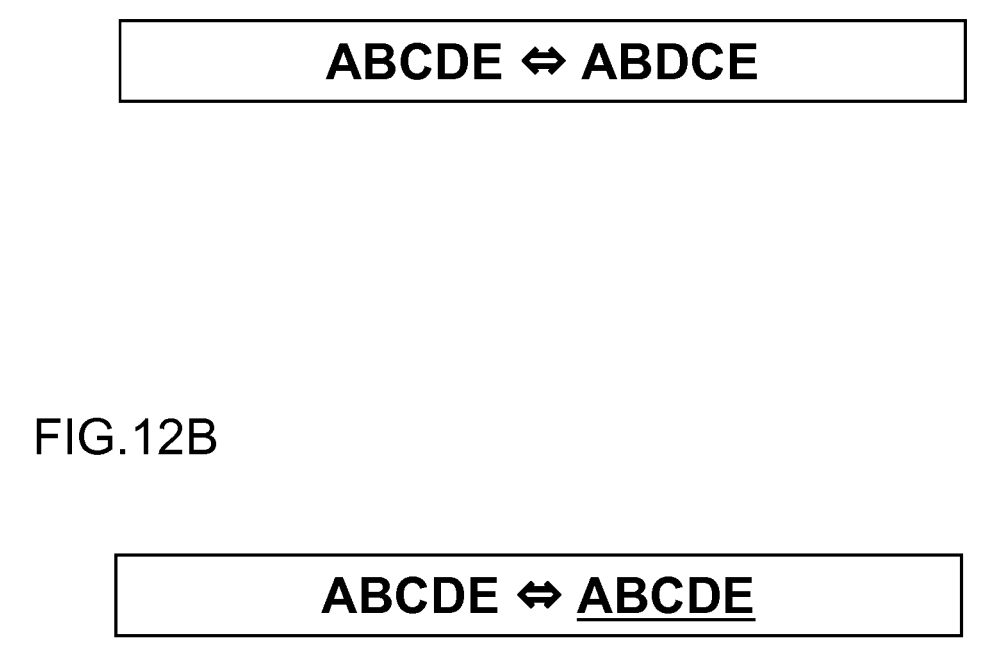

The comparison of content of the character string refers to comparing a degree to which the character string itself is changed. FIG. 12A is shown as an example. In comparing a character string "ABCDE" shown on the left side and a character string "ABDCE" shown on the right side in FIG. 12A with each other, a portion "CD" as a part of the character string on the left side is changed into "DC" in the character string on the right side. In this way, comparing the degree to which the character string itself is changed is the "comparison of content of the character string".

In the case of comparing the content of the character string, as a method for evaluating the analogies of two character strings to be compared, for example, a general analogy evaluation index represented by the Levenshtein distance, or the Jaro-Winkler distance can be used.

By way of the Levenshtein distance, the number of times of each of insertion, deletion, and substitution of character is calculated as a "distance" between two character strings.

For example, two character strings compared, "Kitten" and "Sitting", are used as an example to give a description. In order to obtain the character string "Sitting" from the character string "Kitten", the following operation is required.

[1] "K" is substituted with "S" -> Sitten
[2] "e" is substituted with "i" -> Sittin
[3] "g" is inserted -> Sitting Therefore, the Levenshtein distance is "3". Note that the operations of insertion, deletion, and substitution may be weighted, and the "distance" in a state of being weighted may be calculated. The Damerau-Levenshtein distance may be used which takes into account "the number of times of rearrangement" as well as three operations of insertion, deletion, and substitution.

On the other hand, the comparison of appearance of the character string refers to comparing a degree to which the character string is changed in terms of a font, character size, bold type, or attached line, or a proper combination of these. The "bold type" refers to comparing in terms of whether or not the character string is made bold. The "attached line" refers to comparing in terms of whether or not the character string is underlined or bordered, or in terms of line style.

FIG. 12B shows an example of "add underline". With respect to the character string "ABCDE" on the left side in FIG. 12B, the character string on the right side is not changed in the content of the character string but has an underline added. Such a change is evaluated as a difference in "appearance".

In addition to the comparison of content of the character string, the difference in appearance is taken into account to calculate the analogy of the character string. Elements of the appearance include a font and a graphics state. The font which is an element relating to a character shape has classifications of Type, Font name, and Font family. The graphics state includes elements of color. The graphics state has a Color element and an Overprint element.

The character object has information relating to the font or graphics state attached as the attribute information on the object. By use of the attribute information on the object, the analogy of the character string can be calculated.

<Image Comparison Method>

A viewpoint of comparison of the image may include comparison of the content of the image, comparison of the image size, and consideration of the color space. The comparison of the content of the image includes "comparison of subject shape" and "comparison of color" in the images. The comparison of subject shape is performed by comparing features of two images. As an algorithm for extracting the features, ORB (Oriented FAST and Rotated BRIEF) can be used. The ORB has an advantage in that change in the image can be absorbed to some degrees, such as a scale change, superimposed noise, rotation change, or lighting change between the images. The ORB calculates after gray scale transformation without taking into account with of the color element. The ORB has an advantage in being robust over the scale change, that is, change of enlarging and reducing the image, robust over the noise, robust over the rotation, and robust over the lighting change. The expression "robust" means that even if change occurs between the images, the features can be accurately extracted.

As an algorithm for extracting the features of the image, known algorithms represented by the SIFT (Scale-Invariant Feature Transform) or the SURF (Speeded Up Robust Features) can be used, besides the ORB. However, the ORB has an advantage in high speed processing and being patent-free as compared to the SIFT and the SURF. The information processor 10 in the embodiment uses the ORB. The ORB is implemented in the OpenCV (Open Source Computer Vision Library).

As the method of the "image comparison of color", for example, a method can be used in which the image data is converted into Lab values to compare a histogram. The Lab values are colors expressed using the CIE1976 (L*, a*, b*) color space. As an algorithm for comparing the histogram, known methods can be used, such as a method of calculating correlation of the histogram, a method of calculating intersection of the histogram, a method of applying Pearson's chi-square test, and a method of calculating the Bhattacharyya distance, for example.

<Graphic Comparison Method>

The graphic objects are compared after each of the graphics is converted into the bitmap. The graphic comparison is performed in accordance with the following procedures 1 to 4.

[Procedure 1] First, the character object and the image object are removed from the PDL page.

[Procedure 2] Then, the page from which the image object and the character object have been removed at Procedure 1 is entirely converted into the bitmap.

Figure 13A:
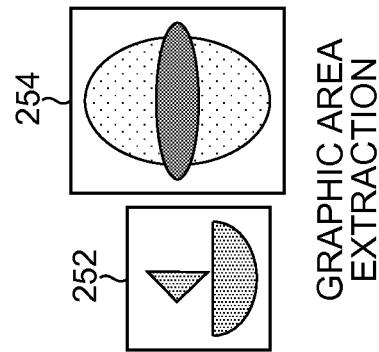
FIGS. 13A to 13C are illustration diagrams of a procedure for extracting a graphic area.

FIG. 13A is an example of the PDL page. A PDL page 200 shown in FIG. 13A includes character objects designated by reference numerals 212 and 214, an image object designated by a reference numeral 222, and graphic objects designated by reference numerals 232 and 234.

Figure 13B:
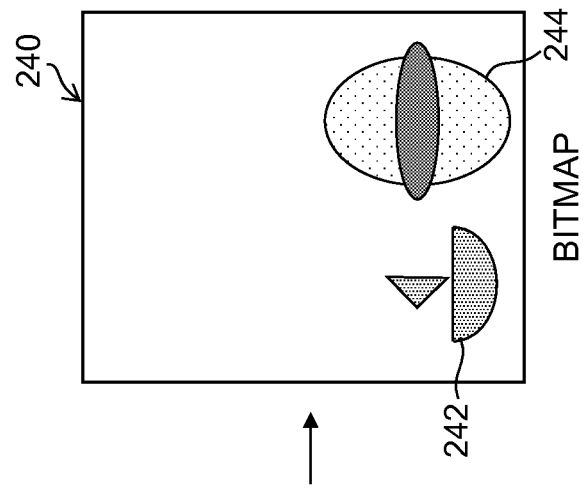

FIG. 13B is an example of the page converted into the bitmap in Procedure 2. The character objects 212 and 214, and the image object 222 are removed from the PDL page 200 shown in FIG. 13A and the entire page is converted into the bitmap, resulting in a bitmap image 240 as shown in FIG. 13B. The bitmap image 240 includes graphic images 242 and 244 respectively corresponding to the graphic objects 232 and 234 shown in FIG. 13A.

[Procedure 3] Areas of the graphic images 242 and 244 are extracted from the bitmap image 240 in the page obtained in Procedure 2.

Figure 13C:
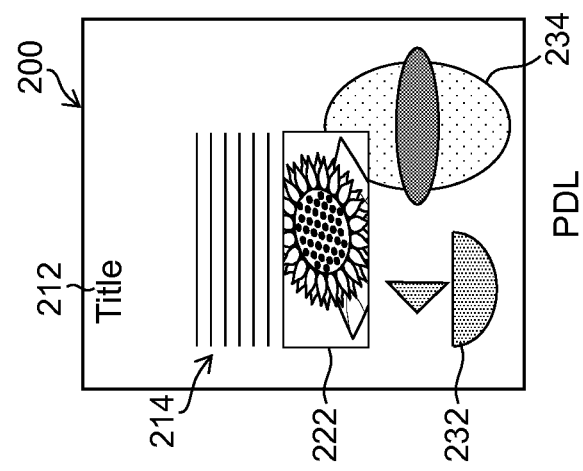

FIG. 13C shows graphic areas 252 and 254 extracted from the bitmap image 240 in Procedure 3. In the case of extracting the graphic areas 252 and 254 from the bitmap image 240, a colored area is extracted from the bitmap image 240, for example. In extracting the colored area, it is preferable that colored pixel areas which are even somewhat apart from each other are recognized as an identical clump of graphic.

[Procedure 4] The graphic areas extracted in Procedure 3 are compared as the images.

Procedures 1 to 3 are performed by the combination of the bitmap conversion unit 26 and the graphic area extraction unit 28 illustrated in FIG. 1. Procedures 1 to 3 are performed by the combination of the bitmap conversion part 88 and the graphic area extraction part 89 illustrated in FIG. 2.

Procedure 4 is performed by the graphic object search unit 76 and the graphic object analogy evaluation unit 77 illustrated in FIG. 1.

<Program Causing Computer to Function as Information Processor>

A program, which causes a computer to function as the information processor implementing the automatic page replacement function and/or the digital plate inspection function described in the above embodiment, can be stored in a CD-ROM (Compact Disc Read-Only Memory), magnetic disk, and other computer-readable media (tangible transient information storage media) to provide the relevant program via the relevant information storage media. Instead of the aspect that the program is stored in such an information storage medium and provided, a telecommunications line such as the Internet can be also used to provide a program signal as a download service.

This program installed in the computer can cause the computer to implement the automatic page replacement function and/or the digital plate inspection function.

An aspect may be used in which a part or all of the program for implementing the automatic page replacement function and/or the digital plate inspection function described in the embodiment is installed in a host computer of a printing system, or is applied as an operation program for a central processing unit (CPU) of a printer or platesetter as an image output device.

<System Configuration Example>

The information processor 10 illustrated in FIG. 1 may be configured into an integrated device in which configurations of the respective units are integrally built in one device, or may be configured into a functionally-distributed isolated type system in which a plurality of devices as individual function units or processing units are combined.

For example, each of a device functioning as the first document data storage unit 12 and a device functioning as the search unit 20 may be configured into a separated device. Each of the page replacement processing unit 22 and the difference detection unit 30 may be configured into a separated device.

For example, the first document data storage unit 12 and second document data storage unit 16 shown in FIG. 1 may be servers for data saving on the network, and the priority setting unit 18, search unit 20, page replacement processing unit 22, bitmap conversion unit 26, graphic area extraction unit 28, difference detection unit 30, display control unit 32, UI control unit 34, operation unit 36, and display unit 38 may be client terminals in a manuscript production company or a printing company. Alternatively, an aspect may be used in which the function of the search unit 20 is provided by way of a server on the network.

<Modification Example 1>

In a case where the second document data 50 includes plural pages after modification, each of the pages is subjected to the search processing and the page replacement processing in the same manner as the method described above.

<Modification Example 2>

The digital plate inspection function described using FIG. 7 to FIG. 10 may be used as a function independent of the automatic page replacement function. In other words, two pages compared with each other by the digital plate inspection function may not be limited to the submitted page after modification 104 and the page before modification 102 searched for by the automatic page replacement function but may be two pages selected arbitrarily. For example, the submitted page after modification 104 and the page having the page number of the replace destination which is grasped in advance may be compared to confirm the changed portion.

<Advantage of Embodiment>

According to the embodiment of the invention, if the second document data including the page after modification is only submitted even with no replace destination page being specified, the page replacement is automatically performed, reducing the work burden on the operator.

Division of labor has proceeded in the printing industry, where a plurality of persons are often engaged in edit, confirmation, and the like of the manuscript, such as a planning company (i.e., client of the printed material) to plan the printed material, a designer or staff in the manuscript production company, a staff in the printing company, and the like. For this reason, a creator creating the modified page and an operator performing the page replacement work and confirmation are not necessarily the identical person. In a case where only the document data of the modified page is submitted, the operator cannot grasp the replace destination page in some cases. In this regard, according to the embodiment, the page before modification corresponding to the submitted page after modification is automatically searched for to perform the page replacement, improving the work efficiency.

According to the digital plate inspection function described in the embodiment, the changed portions in the page before modification and page after modification can be easily confirmed in units of objects. This makes it possible to finely check whether or not the intended correct modification is performed.

Constituent features in the embodiment of the present invention described hereinabove may be adequately changed, added and deleted within a range not departing from the scope of the invention. The invention is not limited to the above described embodiment and many modifications may be made by a person ordinarily skilled in the art within the technical idea of the invention.

What is claimed is:

1. An automatic page replacement apparatus comprising:
a memory configured to store therein first document data having plural pages;
a computer executing a specialized application program for acquiring second document data including fewer pages than the first document data wherein the fewer pages includes at least a replacement page, the replacement page comprising one or more parts of at least one page of the first document data after modification;
a search unit including a computer executing a specialized application program for performing automatic search processing for automatically identifying a page in the first document data before modification which corresponds to the replacement page in the second document data after modification, wherein the search processing is performed among the plural pages in the first document data; and
a computer executing a specialized application program for automatically replacing the page before modification in the first document data identified by the search unit with the replacement page after modification included in the second document data, wherein
each of the first document data and the second document data is expressed in a page description language, and
the search unit further comprises:
an object type determination unit including a computer executing a specialized application program for determining one kind of object type used in the search processing on the basis of priority of search defined with respect to plural object types, objects being classified into the plural object types used for the page description language, and further analyzing an object structure of the page after modification included in the second document data, and a computer executing a specialized application program for performing the search processing by automatically comparing an object belonging to the one kind of object type determined by the object type determination unit of the objects included in the replacement page after modification in the second document data with an object belonging to the one kind of object type of objects included in each of the plural pages in the first document data.

2. The automatic page replacement apparatus according to claim 1, further comprising:

an operation unit configured to accept a user operation specifying the priority; and a priority setting unit configured to set the priority specified from the operation unit to the plural object types.

3. The automatic page replacement apparatus according to claim 1, further comprising an analogy evaluation unit configured to evaluate analogies between the objects for each of the plural object types in units of objects which belong to the same object type.

4. The automatic page replacement apparatus according to claim 1, wherein the plural object types include a character, an image, and a graphic.

5. The automatic page replacement apparatus according to claim 4, wherein the priority is defined in advance as a default setting, with the priority being set in the default setting in the order that a priority for the "character" is the highest, followed by the "image", the "image" followed by the "graphic".

6. The automatic page replacement apparatus according to claim 4, wherein the object type determination unit includes an analysis unit configured to analyze the object structure in units of pages in the second document data, and the analysis unit has a number-of-characters determination part configured to determine whether or not there exists a character object having a character string the number of characters of which is equal to or more than a first threshold, and a number-of-pixels determination part configured to determine whether or not there exists an image object the number of pixels of which is equal to or more than a second threshold.

7. The automatic page replacement apparatus according to claim 4, further comprising a graphic area extraction unit configured to create a bitmap of an area containing at least a graphic object from at least one document data of the first document data and the second document data, and extracts a bitmap area corresponding to the graphic object.

8. The automatic page replacement apparatus according to claim 1, further comprising:

a display unit configured to display page content of each of the page before modification in the first document data and the page after modification;

a difference detection unit configured to detect a difference between an object included the page after modification and an object included in the page before modification by comparing the page after modification that is to be subjected to the page replacement processing by the replacement processing unit with the page before modification in the first document data which is identified by the search unit with respect to the page after modification, the page after modification and the page before modification being in a state of an object of page description data written by the page description language; and a display control unit configured to control the display unit to display the information on the difference detected by the difference detection unit.

9. The automatic page replacement apparatus according to claim 8, wherein a display mode in which the display unit displays the difference includes a plurality of modes that is at least two modes of a first mode in which both the page after modification and the page before modification are arranged to be displayed, a second mode in which the page after modification and the page before modification are toggled to be displayed, and a third mode in which a difference between the page after modification and the page before modification is intensified to be displayed.

10. The automatic page replacement apparatus according to claim 8, wherein the display control unit displays an icon at a portion on the object at which a difference is detected by the difference detection unit, and changes a form of the icon depending on a magnitude of the difference detected by the difference detection unit.

11. The automatic page replacement apparatus of claim 1, wherein the plural object types distinguishable on priority are common to the first document data and the second document data.

12. A non-transitory computer-readable medium recording a specialized application program causing a computer to perform;

storing first document data having plural pages in memory;

acquiring second document data including fewer pages than the first document data, wherein the fewer pages include a replacement page, the replacement page comprising one or more parts of at least one page of the first document data after modification;

automatic search processing for identifying a page in the first document data before modification corresponding to the replacement page in the second document data after modification, the automatic search processing being performed among the plural pages in the first document data; and automatically replacing the page before modification in the first document data identified by the automatic search processing with the replacement page after modification included in the second document data, wherein each of the first document data and the second document data is expressed in a page description language, and the automatic search processing includes an object type determination function to determine one kind of object type used in the search processing on the basis of priority of search defined with respect to plural object types, objects being classified into the plural object types used for the page description language, and by analyzing an object structure of the page after modification included in the second document data, and an object type search processing function to perform the search processing by automatically comparing an object belonging to the one kind of object type determined by the object type determination function of the objects included in the replacement page after modification in the second document data with an object belonging to the one kind of object type of objects included in each of the plural pages in the first document data.

13. An automatic page replacement method comprising using a computer executing a specialized application program to perform:

storing first document data having plural pages in a memory;

acquiring second document data including fewer pages than the first document data, wherein the fewer pages include a replacement page, the replacement page comprising one or more parts of at least one page of the first document data after modification;

performing automatic search processing for identifying a page in the first document data before modification corresponding to the replacement page in the second document data after modification, the automatic searching being performed among the plural pages in the first document data; and automatically replacing the page before modification in the first document data identified by the automatic search step with the replacement page after modification included in the second document data, wherein
  each of the first document data and the second document data is expressed in a page description language, and
  the automatic search step includes
  an object type determination step of determining one kind of object type used in the search processing on the basis of priority of search defined with respect to plural object types, objects being classified into the plural object types used for the page description language, and by analyzing an object structure of the page after modification included in the second document data, and
  an object type search processing step of performing the search processing by automatically comparing an object belonging to the one kind of object type determined by the object type determination step of the objects included in the replacement page after modification in the second document data with an object belonging to the one kind of object type of objects included in each of the plural pages in the first document data.

14. The automatic page replacement method of claim 13, wherein the plural object types distinguishable on priority are common to the first document data and the second document data.

* * * * *